United States Patent
Zhou et al.

(10) Patent No.: US 11,947,197 B2
(45) Date of Patent: Apr. 2, 2024

(54) SPECTACLES FOR PRESBYOPIA TREATMENT AND MYOPIA PROGRESSION CONTROL AND ASSOCIATED METHODS

(71) Applicant: Reopia Optics Inc., Danville, CA (US)

(72) Inventors: Yan Zhou, Pleasanton, CA (US); Barry J. Linder, Danville, CA (US)

(73) Assignee: REOPIA OPTICS, INC., Danville, CA (US)

( * ) Notice: Subject to any disclaimer, the term of this patent is extended or adjusted under 35 U.S.C. 154(b) by 644 days.

(21) Appl. No.: 17/174,910

(22) Filed: Feb. 12, 2021

(65) Prior Publication Data
US 2021/0231977 A1    Jul. 29, 2021

Related U.S. Application Data

(63) Continuation-in-part of application No. 16/366,972, filed on Mar. 27, 2019, now Pat. No. 10,921,612.
(Continued)

(51) Int. Cl.
G02C 7/06        (2006.01)
(52) U.S. Cl.
CPC ......... *G02C 7/061* (2013.01); *G02C 2202/24* (2013.01)
(58) Field of Classification Search
CPC ...... G02C 7/06; G02C 2202/24; G02C 7/022; G02C 7/04; G02C 11/10; G02C 2202/22; G02C 2202/20; G02C 7/088
See application file for complete search history.

(56) References Cited

U.S. PATENT DOCUMENTS 5,483,381 A    1/1996   Baba
5,691,797 A    11/1997  Seidner et al.
(Continued)

FOREIGN PATENT DOCUMENTS

WO    WO 2017/178430    10/2017
WO    WO 2017/222421    12/2017

OTHER PUBLICATIONS

USPTO, ISA/US, "Notification of Transmittal of the ISR and the Written Opinion of the International Searching Authority, or the Declaration," in PCT Application No. PCT/US2019/024705, Jul. 29, 2019, 10 pages

*Primary Examiner* — Wen Huang
(74) *Attorney, Agent, or Firm* — Kang S. Lim

(57) ABSTRACT

A wearable optical device increases a Resolvable Object Distance Range (RODR) thereby reducing focusing demands of a plurality of objects located along a visual angle distance for a user with presbyopia or myopia. The devise includes a negative refractive element and a positive refractive element located along an optical axis. The negative refractive element and the positive refractive element are separated from each other by a separation space and at a separation distance suitable for mounting on a spectacle. A surface of a non-central zone of the negative refractive element or the positive refractive element is a Fresnel surface. The separation space is filled by an intermediate media with a refractive index lower than that of the negative refractive element or the positive refractive element. In one embodiment, the intermediate media is an optical grade resin or polymer. In another embodiment, a spacing seal is located around a periphery of the separation space, and the intermediate media is a low-humidity gas for reducing condensation within the separation space during ambient temperature changes.

23 Claims, 34 Drawing Sheets

Related U.S. Application Data

(60) Provisional application No. 62/649,669, filed on Mar. 29, 2018.

(56) References Cited

U.S. PATENT DOCUMENTS

| | | |
|---|---|---|
| 6,325,508 B1 | 12/2001 | Decreton et al. |
| 6,343,861 B1 | 2/2002 | Kris et al. |
| 6,752,499 B2 | 6/2004 | Aller |
| 7,025,460 B2 | 4/2006 | Smitth et al. |
| 7,401,922 B2 | 7/2008 | Legerton |
| 7,503,655 B2 | 3/2009 | Smith, III et al. |
| 7,637,612 B2 | 12/2009 | Menezes |
| 7,665,842 B2 | 2/2010 | Ho et al. |
| 7,766,478 B2 | 8/2010 | Phillips |
| 7,766,482 B2 | 8/2010 | Smith, III et al. |
| 7,832,859 B2 | 11/2010 | Phillips |
| 7,862,171 B2 | 1/2011 | Varnas et al. |
| 7,992,997 B2 | 8/2011 | Varnas |
| 7,997,725 B2 | 8/2011 | Phillips |
| 7,997,727 B2 | 8/2011 | Ho et al. |
| 8,057,034 B2 | 11/2011 | Ho et al. |
| 8,201,941 B2 | 6/2012 | Choo et al. |
| 8,240,847 B2 | 8/2012 | Holden et al. |
| 8,342,684 B2 | 1/2013 | Ho et al. |
| 8,672,472 B2 | 3/2014 | Holden et al. |
| 8,684,520 B2 | 4/2014 | Lindacher et al. |
| 8,690,319 B2 | 4/2014 | Menezes |
| 8,833,936 B2 | 9/2014 | Varnas |
| 8,876,287 B2 | 11/2014 | Back et al. |
| 8,899,746 B2 | 12/2014 | Back |
| 8,931,897 B2 | 1/2015 | Holden et al. |
| 8,950,859 B2 | 2/2015 | Tung |
| 8,950,860 B2 | 2/2015 | Tse et al. |
| 8,998,408 B2 | 4/2015 | Wei et al. |
| 9,195,074 B2 | 11/2015 | Bakaraju et al. |
| 9,201,250 B2 | 12/2015 | Bakaraju et al. |
| 9,274,351 B2 | 3/2016 | Drobe |
| 9,360,683 B2 | 6/2016 | Buehren |
| 9,477,097 B2 | 10/2016 | Holden et al. |
| 9,500,881 B2 | 11/2016 | Holden et al. |
| 9,535,263 B2 | 1/2017 | Bakaraju et al. |
| 9,541,773 B2 | 1/2017 | Bakaraju et al. |
| 9,547,182 B2 | 1/2017 | Collins et al. |
| 9,575,334 B2 | 2/2017 | Bakaraju et al. |
| 9,594,257 B2 | 3/2017 | Martinez et al. |
| 9,594,258 B2 | 3/2017 | Fujikado et al. |
| 9,594,259 B2 | 3/2017 | Brennan et al. |
| 9,625,739 B2 | 4/2017 | Brennan et al. |
| 9,638,936 B2 | 5/2017 | Brennan et al. |
| 9,733,494 B2 | 8/2017 | Brennan et al. |
| 9,759,930 B2 | 9/2017 | Bakaraju et al. |
| 9,791,718 B2 | 10/2017 | Drobe et al. |
| 9,829,722 B2 | 11/2017 | Tse et al. |
| 2010/0073629 A1 | 3/2010 | Menezes |
| 2010/0259717 A1 | 10/2010 | Fermigier et al. |
| 2010/0296058 A1 | 11/2010 | Ho et al. |
| 2013/0182215 A1 | 7/2013 | Tung |
| 2014/0111763 A1 | 4/2014 | Griffin |
| 2017/0115509 A1 | 4/2017 | Brennan et al. |
| 2017/0184875 A1 | 6/2017 | Newman |
| 2017/0192252 A1 | 7/2017 | Brennan et al. |
| 2017/0227788 A1 | 8/2017 | Griffin et al. |
| 2017/0276961 A1 | 9/2017 | Wooley et al. |
| 2017/0336653 A1 | 11/2017 | Bakaraju |
| 2019/0302481 A1* | 10/2019 | Zhou ..................... G02C 7/088 |

* cited by examiner

SPECTACLES FOR PRESBYOPIA TREATMENT AND MYOPIA PROGRESSION CONTROL AND ASSOCIATED METHODS

CROSS REFERENCE TO RELATED APPLICATIONS

This application is a continuation-in-part and claims priority of U.S. application Ser. No. 16/366,972, filed on Mar. 27, 2019, recently allowed, which claims priority to U.S. provisional application No. 62/649,669, filed on Mar. 29, 2018, which applications are incorporated herein in their entirety by this reference.

FIELD OF THE INVENTION

One or more embodiments of the present invention relate generally to presbyopia treatment and/or myopia progression control or prevention. In particular, the embodiments are related to the design of presbyopia treatment and anti-myopia progression spectacles.

BACKGROUND

With the popular use of personal computers and mobile cell phones by young children, the percentage of school children developing myopia has increased substantially in the past couple of decades. The onset of myopia also occurs at younger ages as compared to the time before personal computers and mobile cell phones were popular. Although the cause and treatment of myopia have been debated for decades, the exact mechanism of myopia development still remains unclear. However, recent clinical studies have shown that myopia progression can be slowed and controlled. In addition to treatment using pharmaceutical substances like atropine and pirenzepine, another clinically proven approach is to optically extend the depth of focus (or field) by making both distant and nearby objects in focus such that demand for sufficient accommodation is substantially reduced. Still another clinically proven approach is to optically induce paracentral and/or peripheral myopic defocus on the retina, i.e. with sharply focused image of a distant object formed on the fovea or macula, and with paracentral and/or peripheral image shell of a distant off axis object formed in front of the retina.

In addition to reshaping the cornea using, for example, orthokeratology (Ortho-K) to achieve at least one of the two optical effects, many lens designs that produce at least one of the two optical effects have been disclosed to the public. They include different types of progressive addition lenses (PALs), bi-focal lenses, multi-focal lenses, progressive multifocal lenses, and extended depth-of-focus lenses.

Most of these lenses are contact lenses comprising one optical element. An issue with the use of a contact lens is that when children are relatively young (for example, from about 5 years to about 8 years old), they may not be mature enough to be trained to safely put contact lenses on their eyes by themselves. For this group of children, to both correct their refractive error(s) and also slow or stop their myopia progression, it is more desirable to offer them an anti-myopia spectacle.

Towards this need, there are so far only a couple of commercially available anti-myopia progression spectacles that have been commercialized to offer myopia progression control, including the MyoVision spectacle from Zeiss and the Myopilux spectacle from Essilor International. These spectacles have been found to offer only limited efficacy in terms of myopia progression control. For example, the Zeiss MyoVision spectacle lens has been clinically found to be only effective for children who have myopic parents and the average reduction to myopia progression is only about 30% as compared to a control group. The Myopilux Max spectacles claim to have slowed down myopia progression by up to 62%, but only for exophoric children with properly measured and prescribed prismatic bifocal correction. In the case of Essilor International's Myopilux Pro, a progressive addition lens specially designed for esophoric kids, the claimed percentage in myopia progression reduction is only 38%.

Therefore, a need exists for an improved design of an anti-myopia progression spectacle that will reduce the need for large accommodation or demand less accommodation and at the same time can provide clinical efficacy for all myopic children with at least an efficacy comparable to that of some high performance anti-myopia contact lenses or the Ortho-K approach.

SUMMARY

One or more embodiments of the present disclosure satisfy one or more of the above-identified needs in the art. In accordance with the present invention, modified and rearranged lens elements from a reverse Galilean telescope can be incorporated into a wearable Increased Resolvable Object Distance Range (IRODR) spectacle that can simultaneously provide a number of optical properties beneficial for either presbyopia treatment or myopic progression control.

In one embodiment of the present invention, a pair of IRODR lens combinations are made from high index and light weight material is designed as and made into a spectacle to be worn by a patient suffering from presbyopia and/or myopia. The central zone of a negative refractive element and the central zone of a positive refractive element are designed to have a much stronger refractive power than a conventional reverse Galilean telescope. These choices can ensure a short relative distance (preferably less than 30 mm) between the two elements of the IRODR lens combination, thus making the design compact and light enough to be practically wearable by a patient, especially a child.

A second modification is in the weakness of the optical minimization effect for the central zone when viewing a distant object. A conventional reverse Galilean telescope generally minimizes a distant object by a multiple times. In contrast, with IRODR lens combination, the image size change for near and also far objects is within ±50%. With such a design, a nearby object, when viewed by a patient wearing such an IRODR spectacle, will not experience significant size change while being optically pushed further away from the eye.

A third modification is in the net central refractive power. While a conventional reverse Galilean telescope generally has a zero net refractive power, i.e. the front virtual focal point of the negative lens basically overlaps with the front real focal point of the positive lens so that a collimated beam entering the optical system will come out collimated with its beam width reduced, the presently disclosed IRODR lens combination does not have the front focal points overlapping limitation and instead, it has a central zone with an intended net central refractive power to correct the refractive error(s) of a patient eye such that a distant or intermediate or near object can be sharply focused on the fovea or macula while the depth of field is substantially increased.

A fourth modification is in the spatial refractive power distribution over the full spectacle lens area. Instead of keeping the net refractive power relatively constant over the whole area, the spatial refractive power distribution is intentionally made not to be the same. For myopia progression control, at least one portion in a paracentral and/or peripheral zone of the IRODR spectacle is made to have a net add or plus refractive power relative to that in the central zone. This feature will make at least a portion of the image shell of a distant or intermediate object land in front of the paracentral and/or peripheral retina, thus inducing myopic defocus on the paracentral and/or peripheral retina to control myopia progression.

There are also a number other features and/or modifications associated with different embodiments of the present invention. Resulting from at least one of these features and/or modifications, the IRODR spectacle can substantially increase the depth of field (or focus) by optically pushing nearby object away and optically bringing distant object closer, thus providing the capability to not only correct refractive error(s) but also control myopia progression, as well as treat presbyopia.

One object of the present invention is to optically push a nearby object further away from a patient eye. This will cause a nearby object optically to be no longer as near or close to the patient eye. Because of this, the nearby object is no longer perceived as blurred by even a presbyopic eye that does not have any accommodation capability. In the case of a person having accommodation capability, the amount of accommodation required to bring such a nearby object to sharp focus on the retina can be substantially reduced.

Another object is to effectively reduce the entrance pupil size and hence further increase the effective depth of field (or focus). As a result, objects within a larger distance range can be perceived by a patient as in focus even without accommodation, which will further reduce accommodative stress to thereby slow or retard or limit the progression of myopia.

Still another object is to create a certain degree of tunnel vision to limit ocular movement while increasing the angular field of view in the object space such that the most effective retina area in terms of myopia progression control can be fully utilized.

Still another object is to make the IRODR spectacle easily adjustable in terms of providing fine tuning of the net effective refractive error correction power by controlling the relative distance between the two refractive elements in a continuous manner. As a result, fewer discrete refraction power step lenses are needed to cater for a large patient population, thus saving cost.

Still another object is to make the IRODR spectacle automatically adjustable in terms of providing indoor near vision and outdoor distant vision net effective refractive error correction powers by embedding a light sensor and a solar cell or battery together electronics (and firmware if needed) in the spectacle to activate a change in the relative distance between the two refractive elements.

In one embodiment, the negative lens is a plano and aspherical concave lens, and the positive lens is a spherical convex and plano lens. Such a design will have a net positive spherical aberration and hence induce paracentral and/or peripheral myopic defocus on the retina, desired for myopia progression control.

In still another embodiment, instead of minimizing optical distortion, optical distortion is intentionally created by manipulating the spatial distribution of refraction to either induce specially rendered myopic defocus on the paracentral and/or peripheral retina and/or to change optical magnification or demagnification from the central zone to the paracentral zone to the peripheral zone.

Another aspect of the present invention is to make the first surface of the negative lens on the object space side relatively flat or much less curved and the second surface of the negative lens strongly curved, and also to make the first surface of the positive lens strongly curved and the second surface of the positive lens that faces the patient eye relatively flat or much less curved. This way, the outer surfaces of the IRODR lens combination are relatively flat and easy to clean while the two strongly curved surfaces are contained within the IRODR lens combination.

Still another aspect of the present invention is to have the paracentral and/or peripheral region of either the negative lens or the positive lens or both lenses formed like a Fresnel lens such that the overall thickness of the lens(es) can be made substantially thinner. The paracentral and/or peripheral Fresnel lens portion(s) is(are) preferably formed on the strongly curved surface(s).

In one embodiment, the paracentral and/or peripheral Fresnel lens portion is made of multiple rings or race tracks with radially increasing relative power addition. In another embodiment, the paracentral and/or peripheral Fresnel portion has radially discontinuous power addition and/or subtraction to further extend the depth of field (or focus) in a manner similar to that of a typical bifocal or trifocal or extended depth of focus contact lens.

In still another embodiment, for both the continuous and discontinuous lens surface profile cases, the relative refractive power increases continuously or discontinuously from the central zone to the paracentral zone as well as within the paracentral zone and then further increases continuously or discontinuously from the paracentral zone to the peripheral zone and/or within the peripheral zone. In such a case, compared to the net refractive power of the central zone that corrects the refractive error(s) of a myopic eye, the paracentral zone of the IRODR spectacle will form myopically defocused image of distant or intermediate paracentral object on the paracentral retina that is most effective in terms of myopic progression control, and the peripheral region of the IRODR spectacle will bend peripheral light rays with stronger light bending power to expand the field of view.

In still another embodiment, for both the continuous and discontinuous lens surface profile cases, the relative refractive power increases continuously or discontinuously from the central zone to the paracentral zone as well as within the central zone and then decreases continuously or discontinuously from the paracentral zone outer edge to the outer edge of the peripheral zone. In such a case, compared to the net refractive power of the central zone that corrects the refractive error(s) of a myopic eye, the paracentral region of the IRODR spectacle will form myopically defocused image of distant or intermediate paracentral object on the paracentral retina that is most effective in terms of myopic progression control, and the peripheral region of the IRODR spectacle will gradually lessen the effect of optical minimization and will transition to normal vision near the edge of the peripheral region.

Still another aspect of the present invention is to make the IRODR combination have astigmatism correction capability. The astigmatism correction means can be made on any one of the optical interfaces and preferably, the astigmatism correction means is implemented by shaping one or both of the outer two relatively flatter surfaces so fabrication of the two inner surfaces can be more standardized to save cost.

Still another aspect of the present invention is to make the IRODR combination also have high order aberration correction capability. Modification of the net refractive power over the whole area of the spectacle lens can be made with freeform optics to not only correct central refractive errors (including astigmatism) but also compensate other higher order aberrations in order to form an ideal image shell with sharp focus of distant or intermediate object on the fovea or macula and ideal myopic defocus in the desired paracentral and/or peripheral retinal area to maximize the myopia progression control or prevention effect. For example, one ideal myopic defocus in the desired paracentral and/or peripheral retinal area is to make the sagittal image shell sharply focused on the paracentral and/or peripheral retinal area.

Still another aspect of the present invention is to design a near vision region on the lower portion of the IRODR spectacle and a distant or intermediate vision region on the central and upper portion of the IRODR spectacle in a similar fashion as a standard bifocal spectacle lens or a progressive addition spectacle lens offers, where again any one or more of the optical interfaces can be shaped appropriately to achieve the goal.

In one embodiment, the discontinuity in refractive power transition between the lower portion and the central/upper portion of the spectacle is made on one or both of the two inner lens surfaces so the step is not felt on one or both of the two outer surfaces. In another embodiment, the lower near vision portion has a different optical minimization percentage than that of the upper distance vision portion.

Still another aspect of the present invention is to design a near vision region on the lower portion of the IRODR combination and a distant vision region on the central/upper portion of the IRODR combination with a progressive add power transition in a similar manner as a standard progressive addition spectacle lens offers, where again any of the optical interfaces can be shaped appropriately to realize the design.

Still another aspect of the present invention is to design the IRODR spectacle such that it deliberately creates a certain degree of tunnel vision with image from a large field of view in the object space formed (with a certain degree of paracentral and/or peripheral myopic defocus for the case of myopia progression control) only within a desired central portion of the retina that is most effective in controlling myopia progression. This can be achieved by making the peripheral region of the IRODR spectacle having a stronger net negative refracting or prismatic power to bend peripheral light rays towards the paracentral region of the retina.

In one embodiment, the tunnel vision effect is created with a black tube section that mechanically holds the two refractive elements of the IRODR spectacle together. In another embodiment, the tunnel vision effect is created by forming a black peripheral or annular ring or race track on any one or more of the optical interfaces of the two refractive elements. In still another embodiment, the tunnel vision effect creation annular ring or race track is formed with apodization or gradual transparent-to-opaque-transition or gradual transparent-to-opaque-to-transparent transition. In still another embodiment, the object field of view is further enlarged by designing the refractive element(s) panoramically curved.

These and other features and advantages of the present invention will become more readily apparent to those skilled in the art upon review of the following detailed description of the preferred embodiments taken in conjunction with the accompanying drawings.

BRIEF DESCRIPTION OF THE DRAWINGS

In order that the present invention may be more clearly ascertained, some embodiments will now be described, by way of example, with reference to the accompanying drawings, in which.

$$\frac{[(|q_2|-d)-p_1]}{p_1},$$

Figure 9:
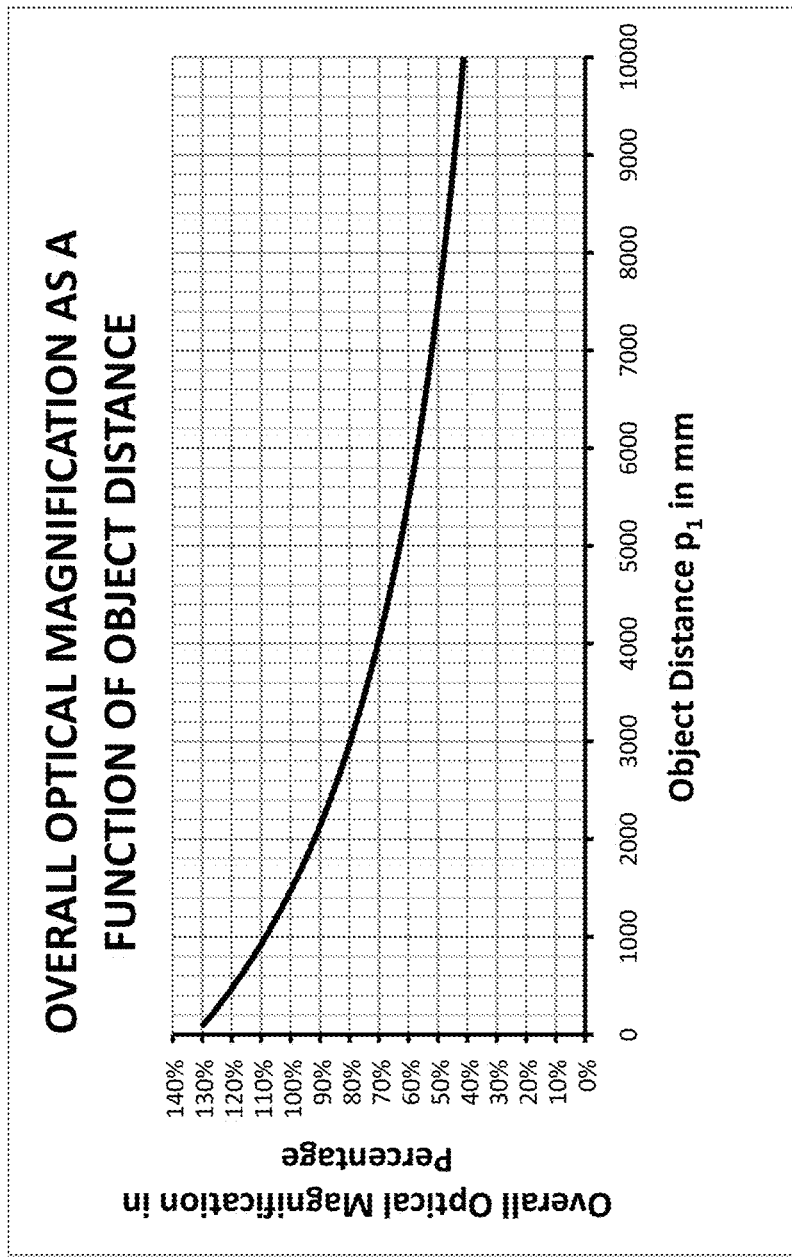
Figure 10:
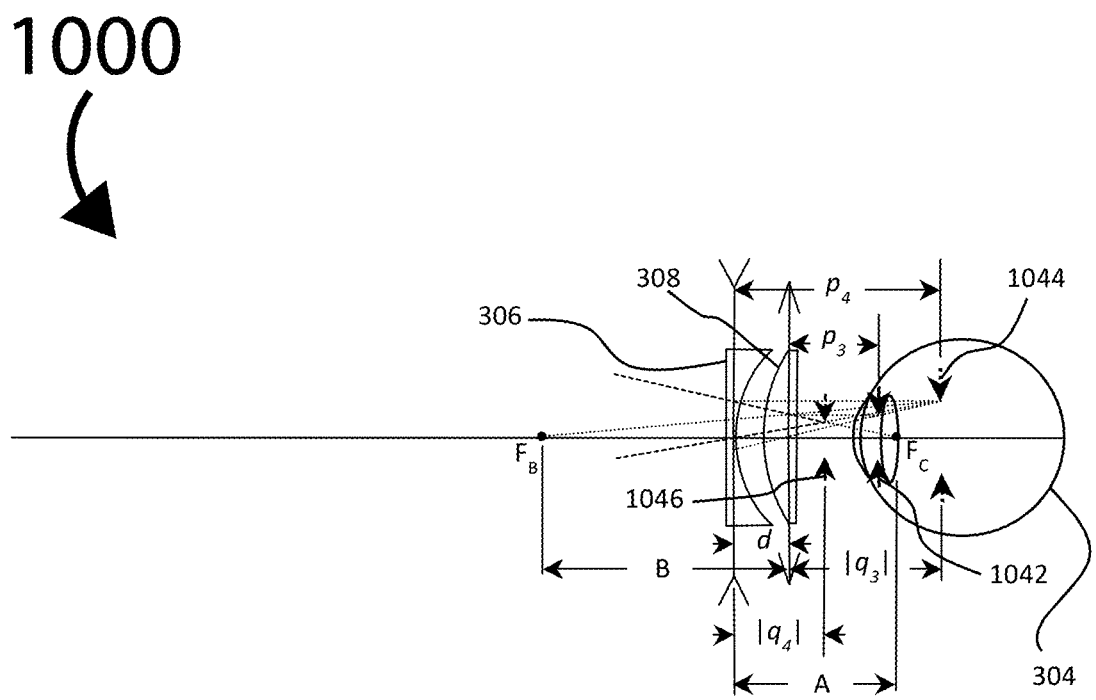
Figure 11:
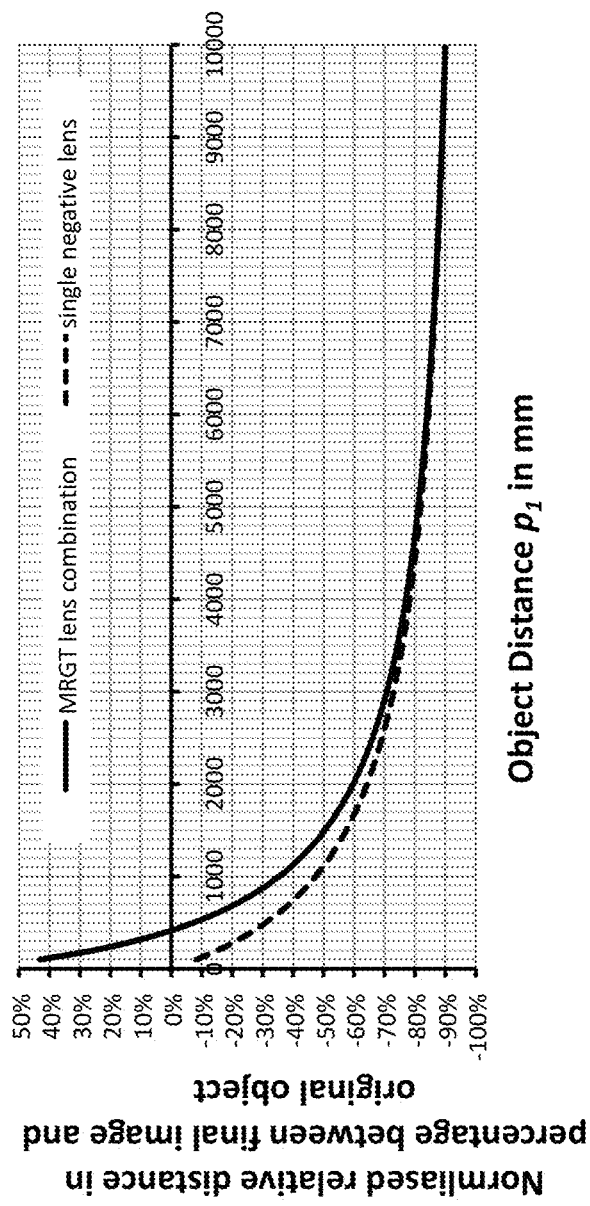
Figure 12A:
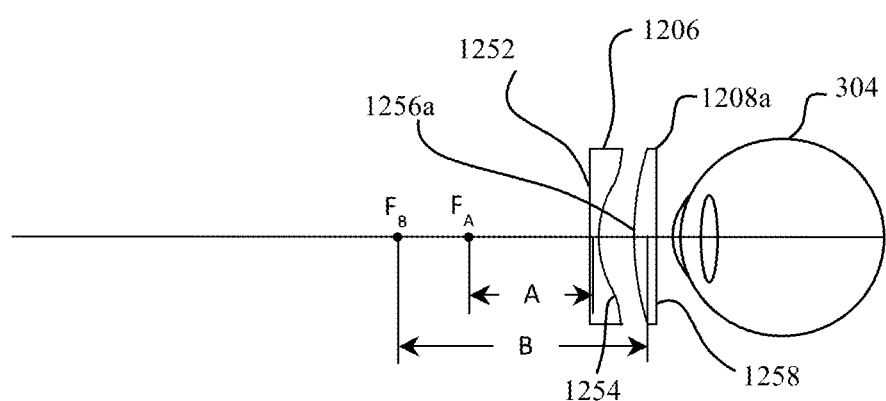
Figure 12B:
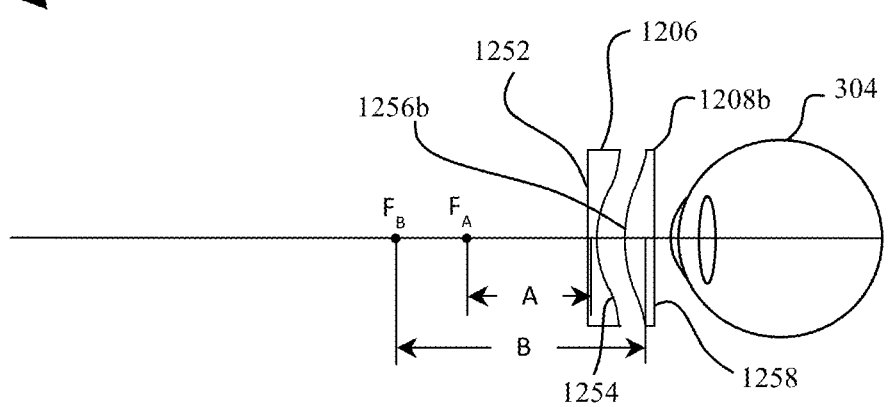
Figure 12C:
Figure 12C:
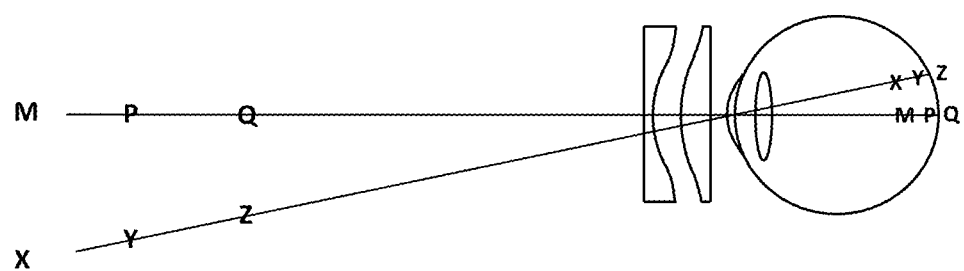
Figure 12C:
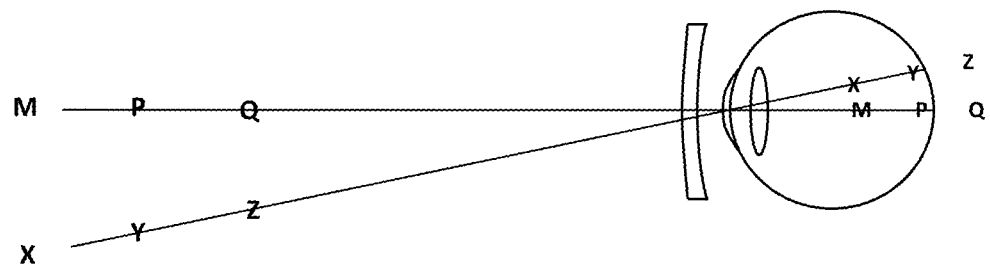
Figure 13:
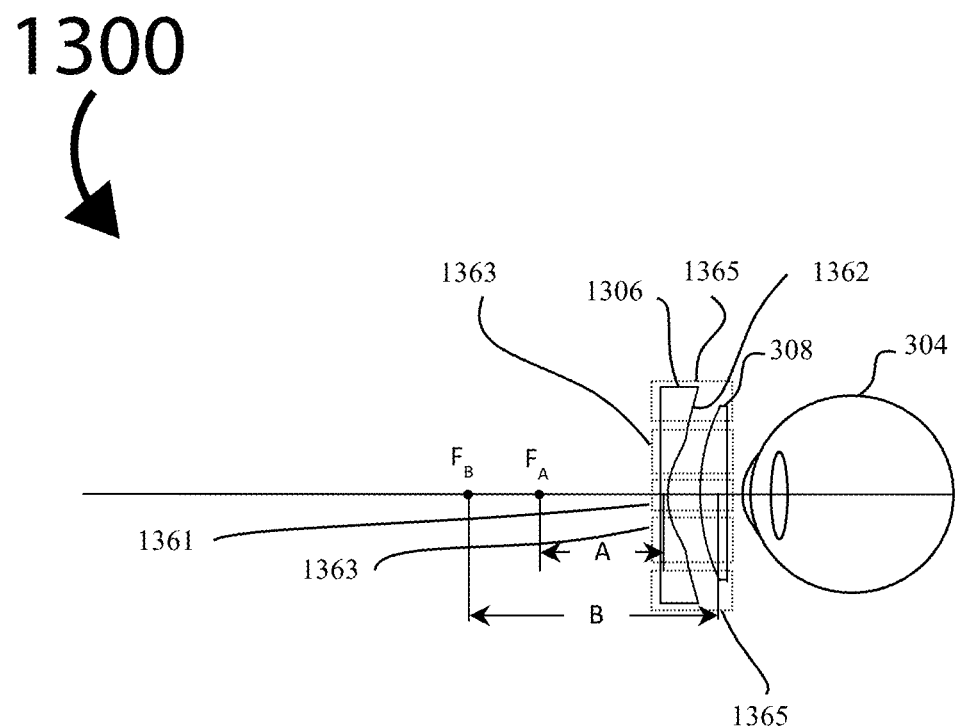
Figure 14:
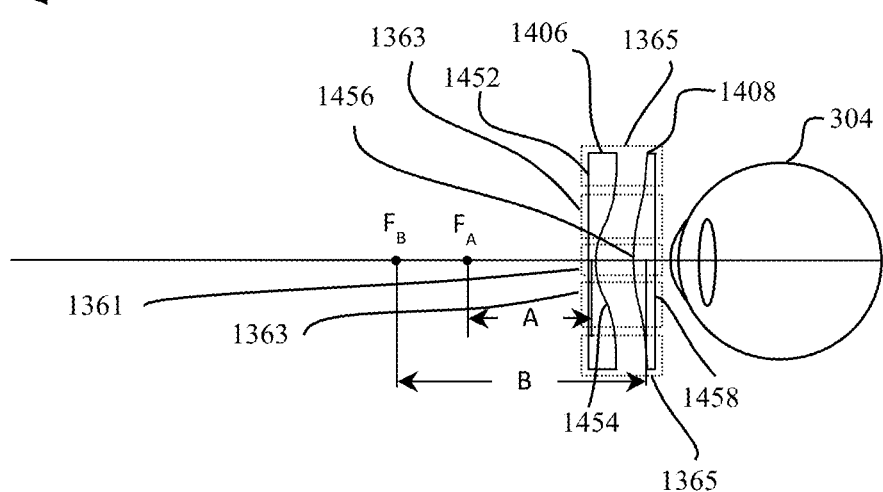
Figure 15:
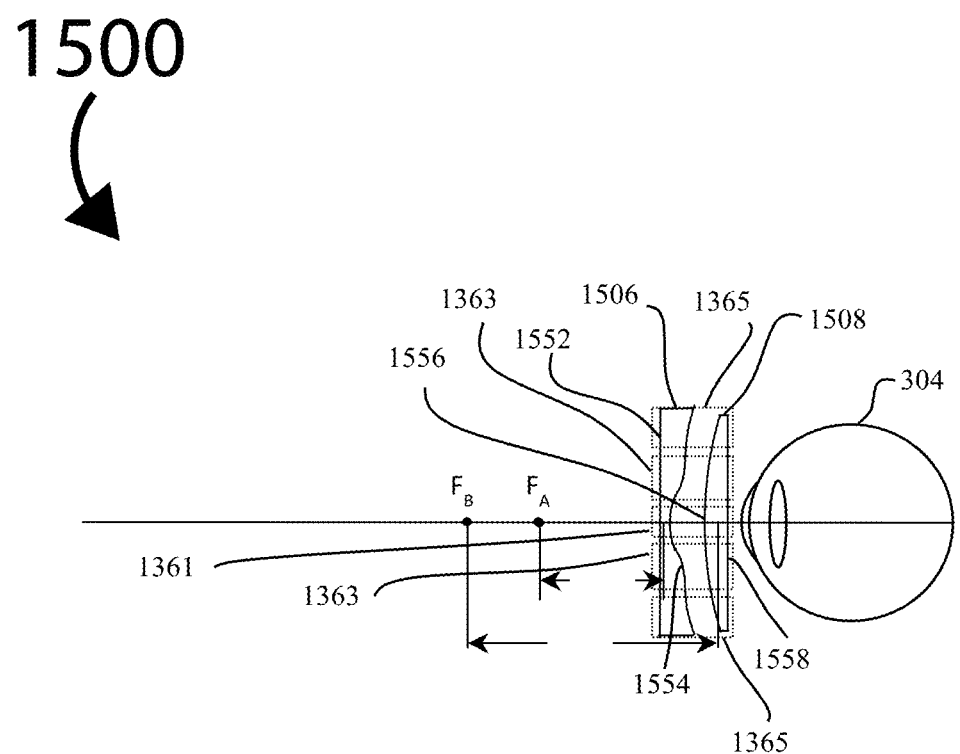
Figure 16A:
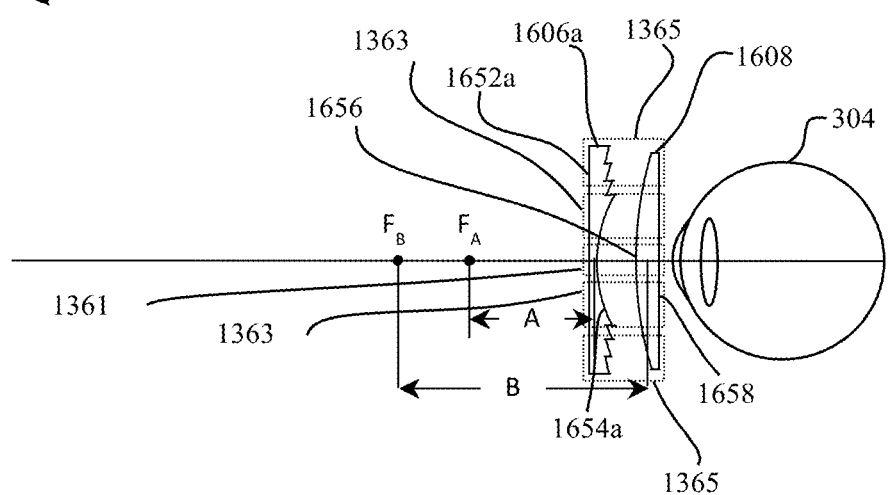
Figure 16B:
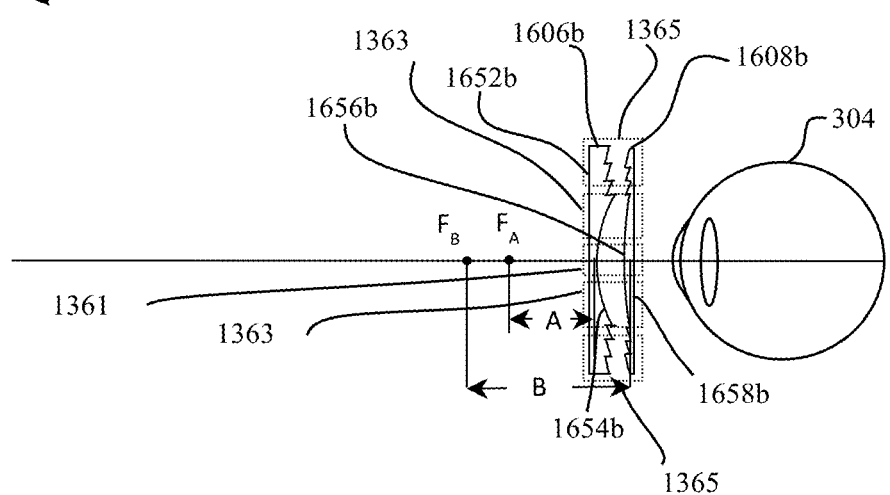
Figure 16C:
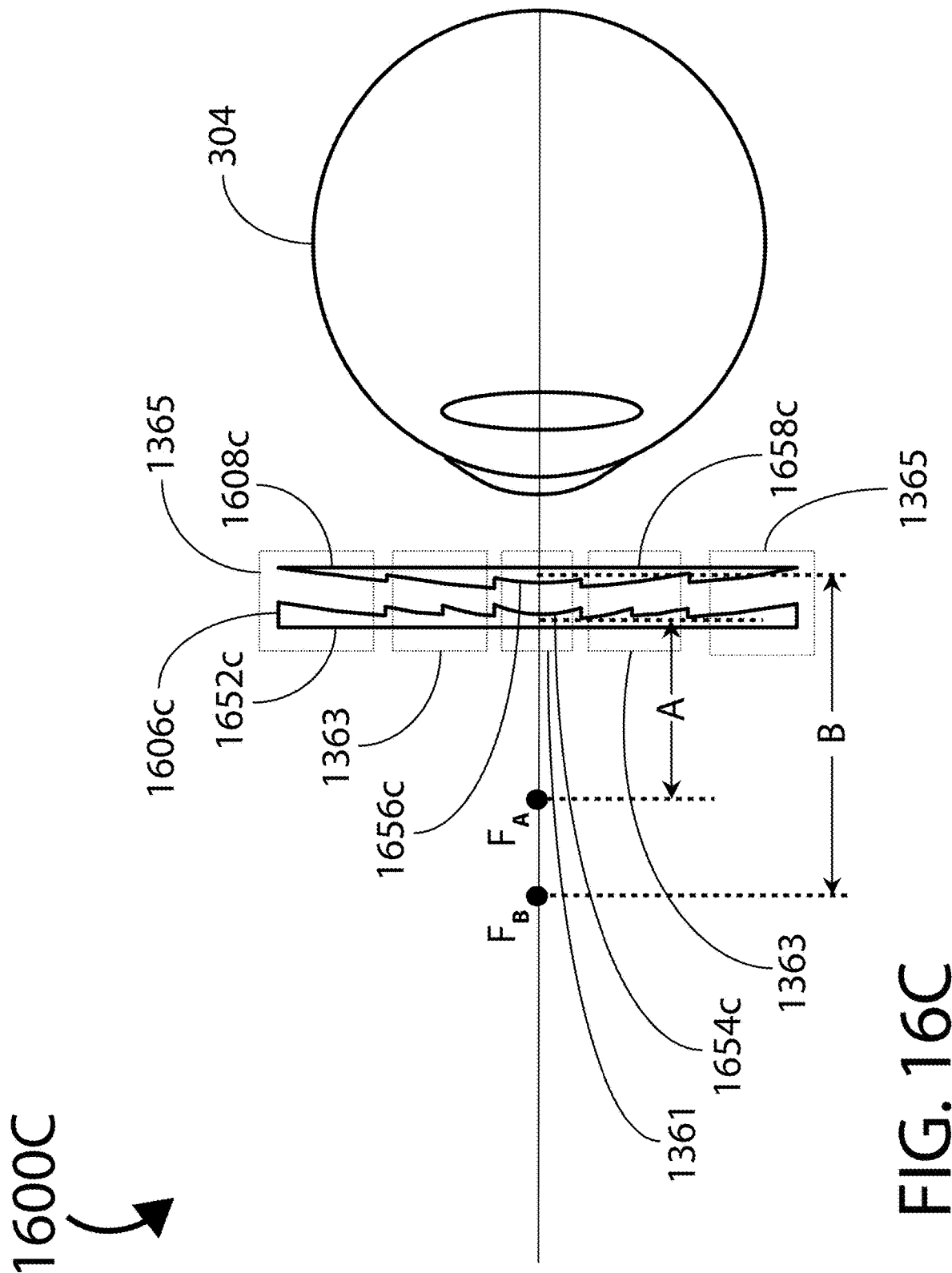
Figure 16D:
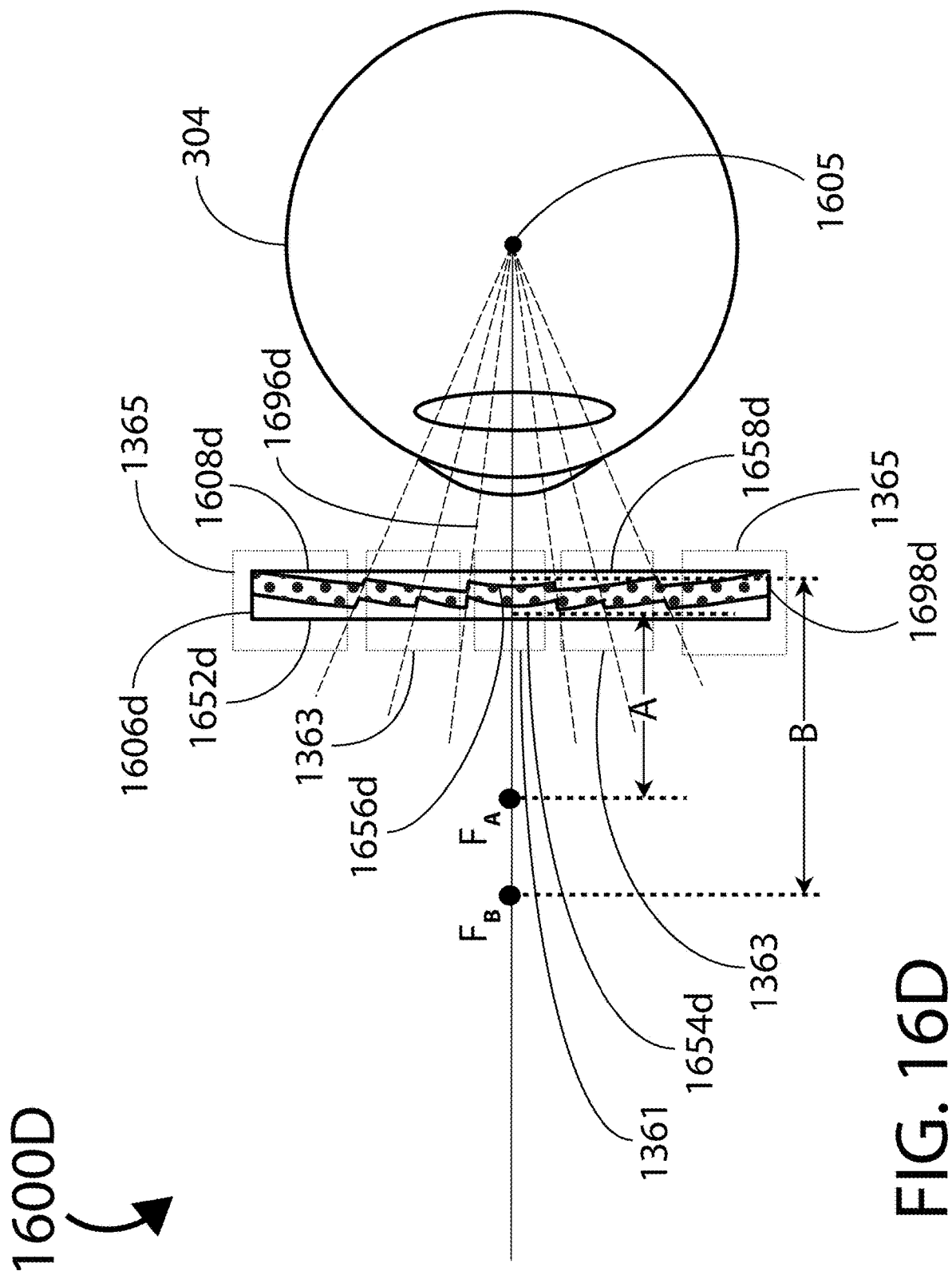
Figure 16E:
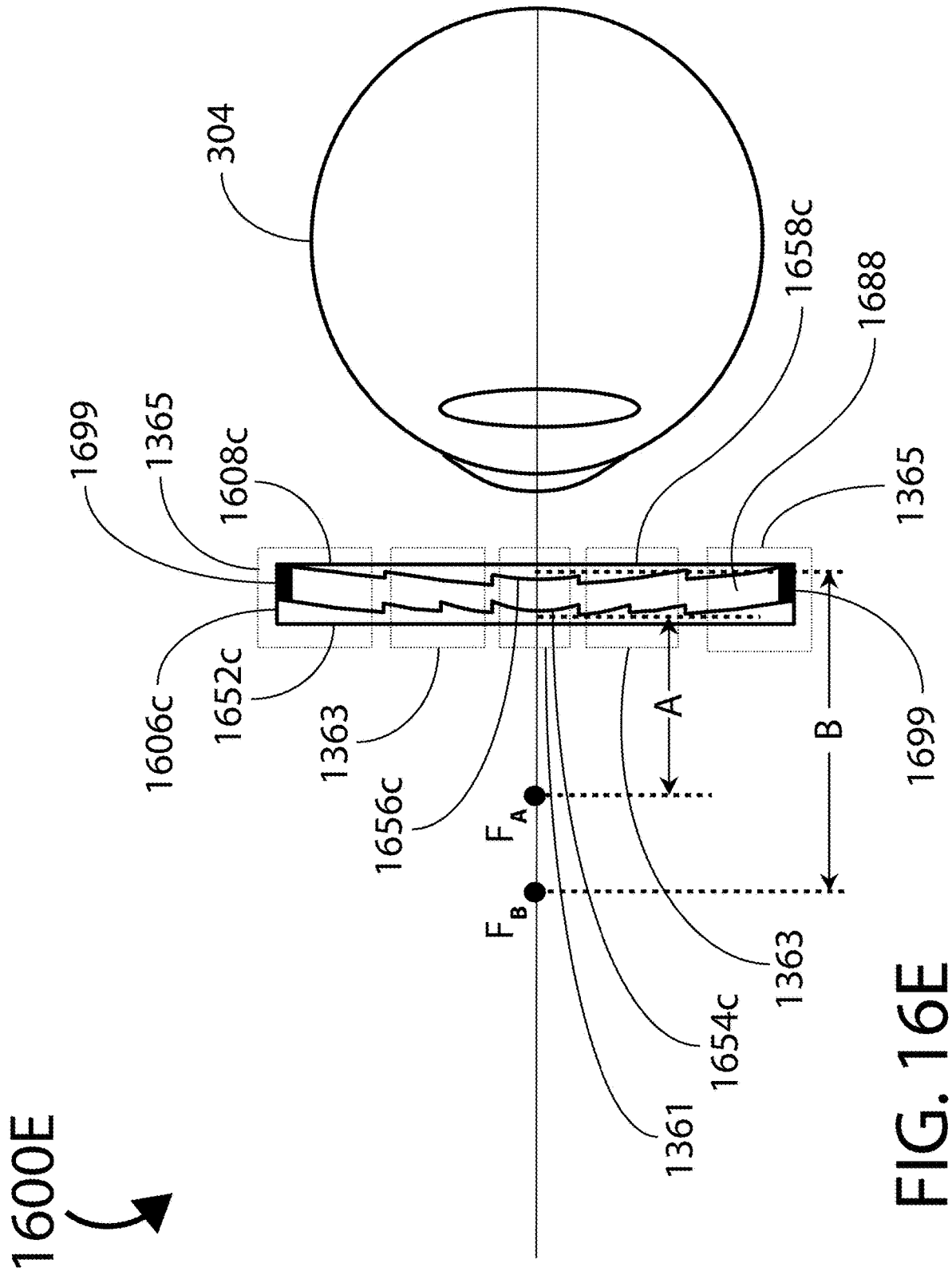
Figure 17:
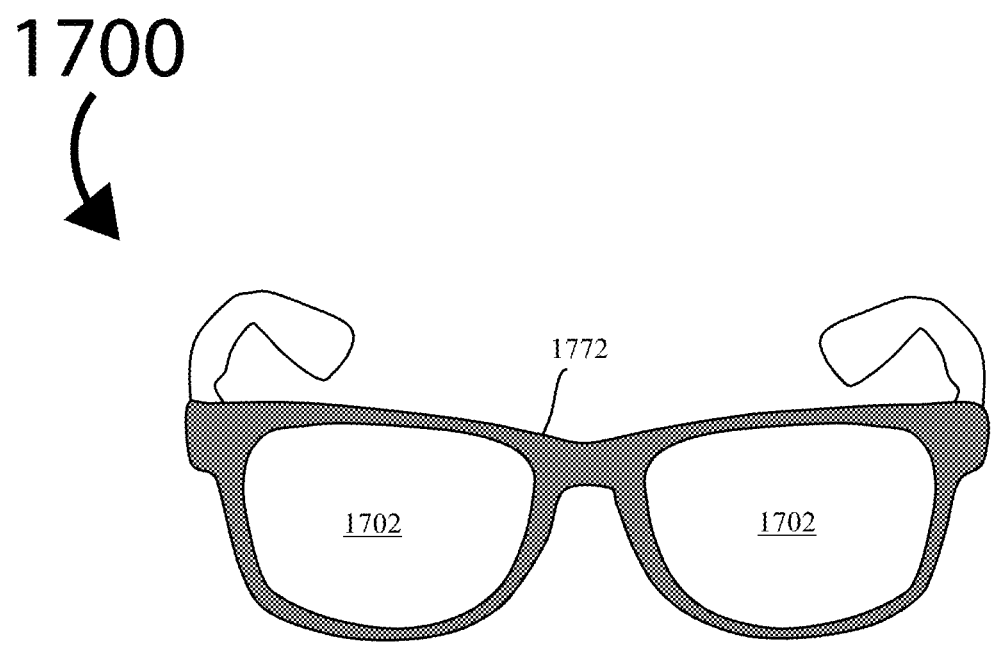
Figure 18:
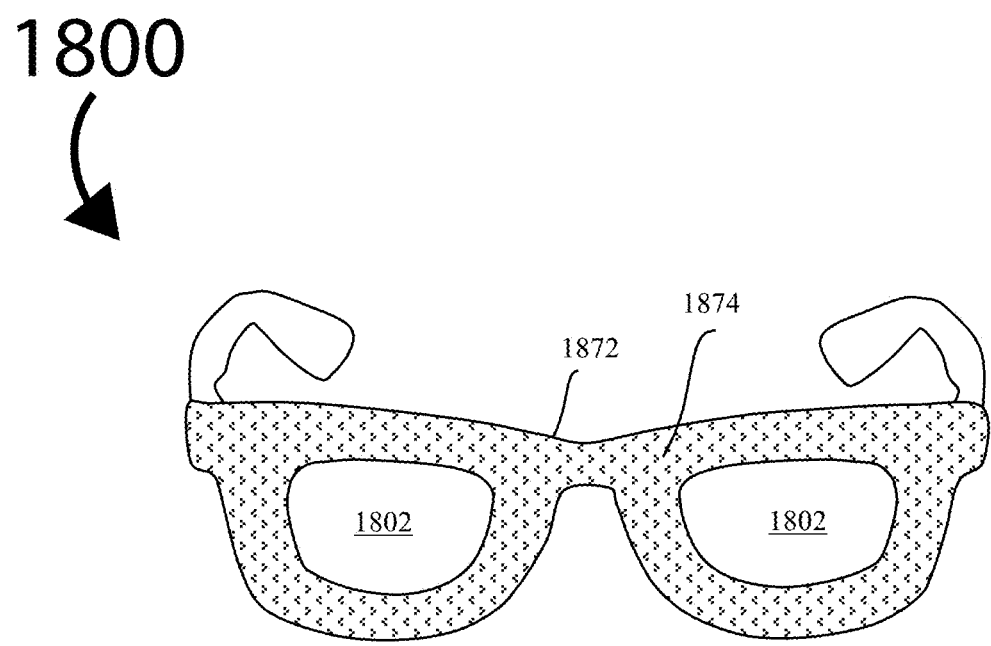
Figure 19:
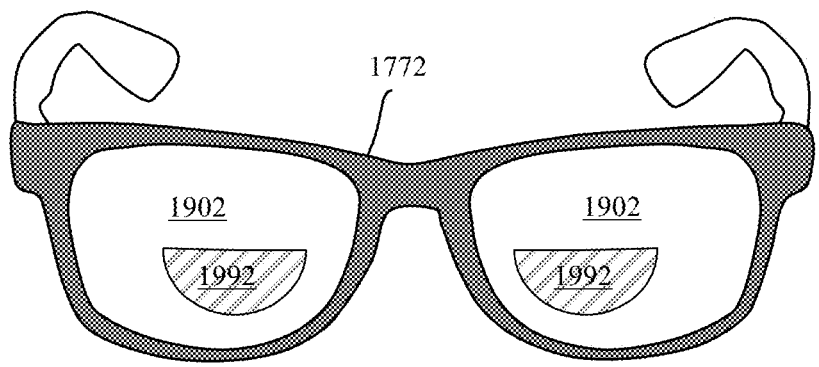
Figure 20:
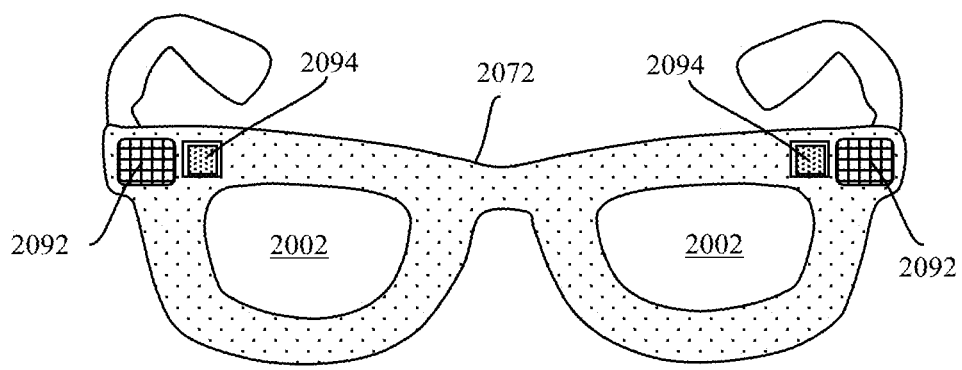
Figure 21:
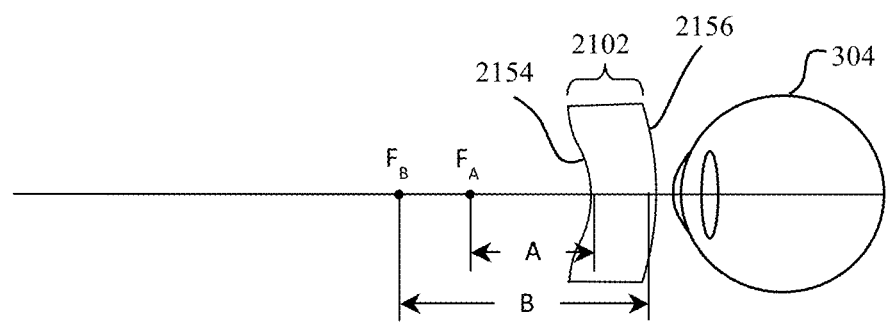
Figure 22:
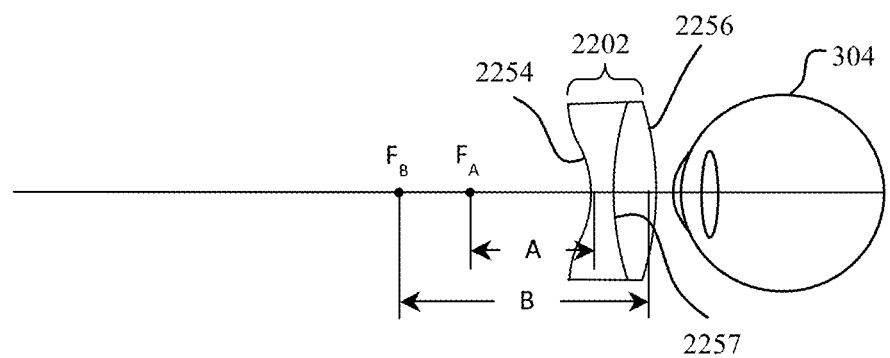

as a function of the original object distance p1 over an object distance range from 100 mm to 10000 mm or from 0.1 m to 10 m;

FIG. 9 shows the plot of the overall optical magnification as function of the object distance over an object distance range from 100 mm to 10000 mm or from 0.1 m to 10 m;

FIG. 10 shows how the patient eye pupil is treated as an object and is imaged by the IRODR lens combination in the reverse direction to appear as a smaller pupil;

FIG. 11 shows how the presently disclosed IRODR lens combination can be adjusted to provide myopia correction. With a decrease in the separation distance between the negative and the positive lens, the position of the final virtual image is brought closer. In addition, it also shows a comparison between the presently disclosed IRODR lens combination (solid curve) and a single element negative lens (dashed curve) in terms of the relative percentage of position difference between the final image and the original object normalized by object distance as a function of the object distance over an object distance range from 100 mm to 10000 mm or from 0.1 m to 10 m when an object at 10 meter is imaged to 1 meter;

FIG. 12A shows one embodiment of the presently disclosed IRODR spectacle in which the paracentral and peripheral zone are designed to provide overall net positive spherical aberration;

FIG. 12B shows an embodiment in which in addition to the aspheric design of the back surface of the negative lens, the front surface of second the positive lens also has an aspheric design;

FIG. 12C shows a comparison of the sharp focus image positions of some optical environment objects as they land on the retina. The case of an eye wearing an IRODR spectacle lens combination is shown in the upper portion, whereas the case of the same eye wearing a conventional single element vision correction spectacle lens is shown in the lower portion;

FIG. 13 shows an embodiment in which the peripheral zone of the negative lens has a prism structure like an annular negative axicon lens that can control or expand the field of view;

FIG. 14 shows an embodiment in which the central and paracentral zone of the IRODR lens combination does not induce spherical aberration while in the peripheral zone the net refractive power of the combination gradually reduces to a value as that of a conventional single element prescription lens would have for the treatment of myopia;

FIG. 15 shows another embodiment in which the relative refractive power has a net add power in the paracentral zone relative to the central zone and then a net decreasing power in the peripheral zone relative to the paracentral zone. These can be achieved by changing either the surface profiles of the negative lens or the surface profiles of the positive lens or the surfaces profiles of both the negative lens and the positive lens;

FIG. 16A shows another embodiment in which the peripheral zone of the negative lens is made with a Fresnel lens design so the overall thickness of the negative lens is reduced while the same goal to allow the peripheral portion of the retina to sense the presence of any peripheral object, especially the movement of peripheral object is achieved;

FIG. 16B shows an embodiment in which the peripheral zones of both the negative lens and the positive lens are all made with Fresnel lens designs so the overall thickness of the IRODR lens combination can be further reduced;

FIG. 16C shows an embodiment in which both the paracentral and the peripheral zones of both the negative lens and the positive lens are all made with Fresnel lens designs so the overall thickness of the IRODR lens combination can be even further reduced;

FIG. 16D shows an embodiment in which the IRODR device is made with a low refractive index optical medium rather than air in between the two Fresnel design like optical refraction elements so the device is more robust and its overall thickness can be made even smaller;

FIG. 16E shows an embodiment in which the IRODR device has its space in between the two Fresnel design like optical refraction elements purged with dry nitrogen and sealed to avoid internal moisture condensation when there is sharp temperature change;

FIG. 17 shows an embodiment where a pair of presently disclosed IRODR combination is mounted on a frame as a spectacle;

FIG. 18 shows an embodiment in which a thicker opaque band is deliberately created by making lens mounting frame section thicker such that the field of view border as seen through the IRODR combination is just connected to the field of view outside the lens mounting frame;

FIG. 19 shows an embodiment where there is a net overall addition of positive refraction power in a lower portion of the IRODR combination relative to that in the center and upper portion of the IRODR spectacle;

FIG. 20 shows an embodiment in which solar cells and light sensors are embedded in the frame of the IRODR spectacle together with electronics and firmware (not shown) to determine if a patient wearing the spectacle is indoor or outdoor and hence to keep or actuate a change in the separation between the two refractive elements;

FIG. 21 shows one embodiment in which one relatively thick optical medium is shaped such that its front surface is strongly concavely curved to function as a negative refracting element and its back surface is strongly convexly curved to function as a positive refracting element; and FIG. 22 shows one embodiment in which three optical interfaces are employed to achieve the same goal with the intermediate optical interface serving the function to provide chromatic and spherical aberration correction.

DETAILED DESCRIPTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention. In the following description, numerous specific details are set forth in order to provide a thorough understanding of the various embodiments. However, the present invention may be practiced without some or all of these specific details. In other instances, well known process operations have not been described in detail in order not to unnecessarily obscure nor apply limitations to the present invention. Further, each appearance of the phrase "embodiment" at various places in the specification does not necessarily refer to the same example embodiment.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "always," "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

Figure 1A:
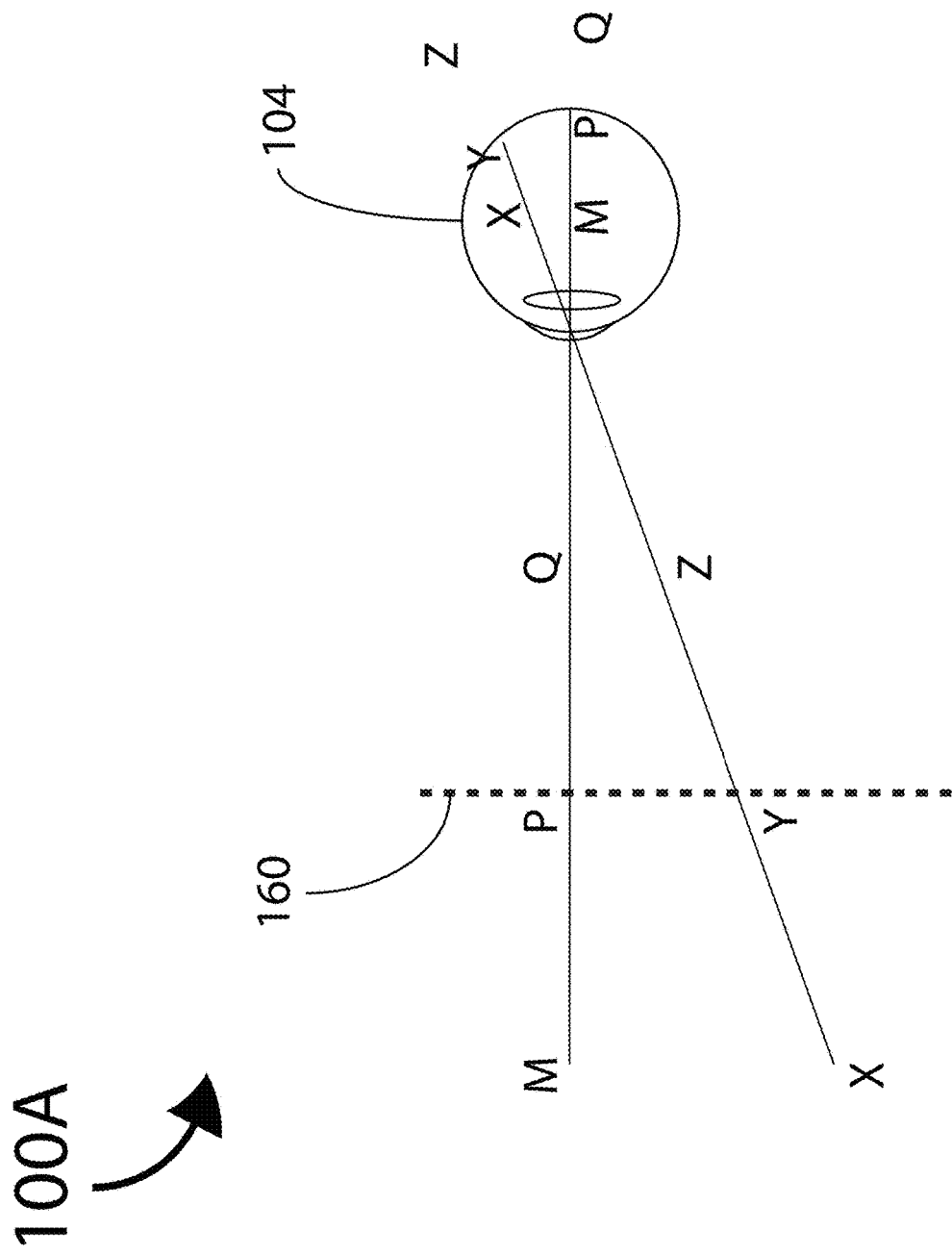
FIG. 1A shows what happens to the sharp focus image positions relative to the retina of a young emmetropic eye when the eye is fixating on object P and when different objects from the surrounding optical environment are imaged by the emmetropic eye onto its retina.

FIG. 1A shows what happens to the sharp focus image positions relative to the retina of a young myopic eye 104 when different objects (M, P, Q as central objects and X, Y, Z as peripheral objects) from the surrounding optical environment are imaged by the eye 104 onto its retina. The eye 104 is assumed to fixate on a central object P. In this case, central object M which is further away from central object P will form its image M in front of the central retina at a relatively larger distance and central object Q which is closer than central object P from the eye 104 will form its image Q behind the retina at a relatively larger distance.

At the same time, paracentral and/or peripheral objects will also cast their images relative to the retina. If the distance of paracentral and/or peripheral object from the eye 104 X is about the same as that of central object M, paracentral and/or peripheral object X will form its image X in front of the paracentral and/or peripheral retina also at a relatively large distance as in the case of object M. Paracentral and/or peripheral object Y, which is at an object distance approximately as that of object P as indicated by the dashed line 160, will cast its image Y near the paracentral and/or peripheral retina. Paracentral and/or peripheral object Z, which is closer to the eye as central object Q, will cast its image Z behind the paracentral and/or peripheral retina also at a relatively large distance.

Those behind the retina paracentral and/or peripheral images are said to be hyperopically defocused on the paracentral and/or peripheral retina. Some clinical studies have shown that accommodation and hyperopically defocused paracentral and/or peripheral retinal images can both produce signals to cause the eye to elongate.

However, in an outdoor environment, paracentral and/or peripheral objects are generally still quite some distance from a person's eye so the need for accommodation is much less than indoor case and also the degree of hyperopic defocus on the corresponding paracentral and/or peripheral retina is also lower than in indoor case, i.e. their retinal images are only slightly behind the paracentral and/or peripheral retina so the signal to cause the eye to elongate is weak.

Figure 1B:
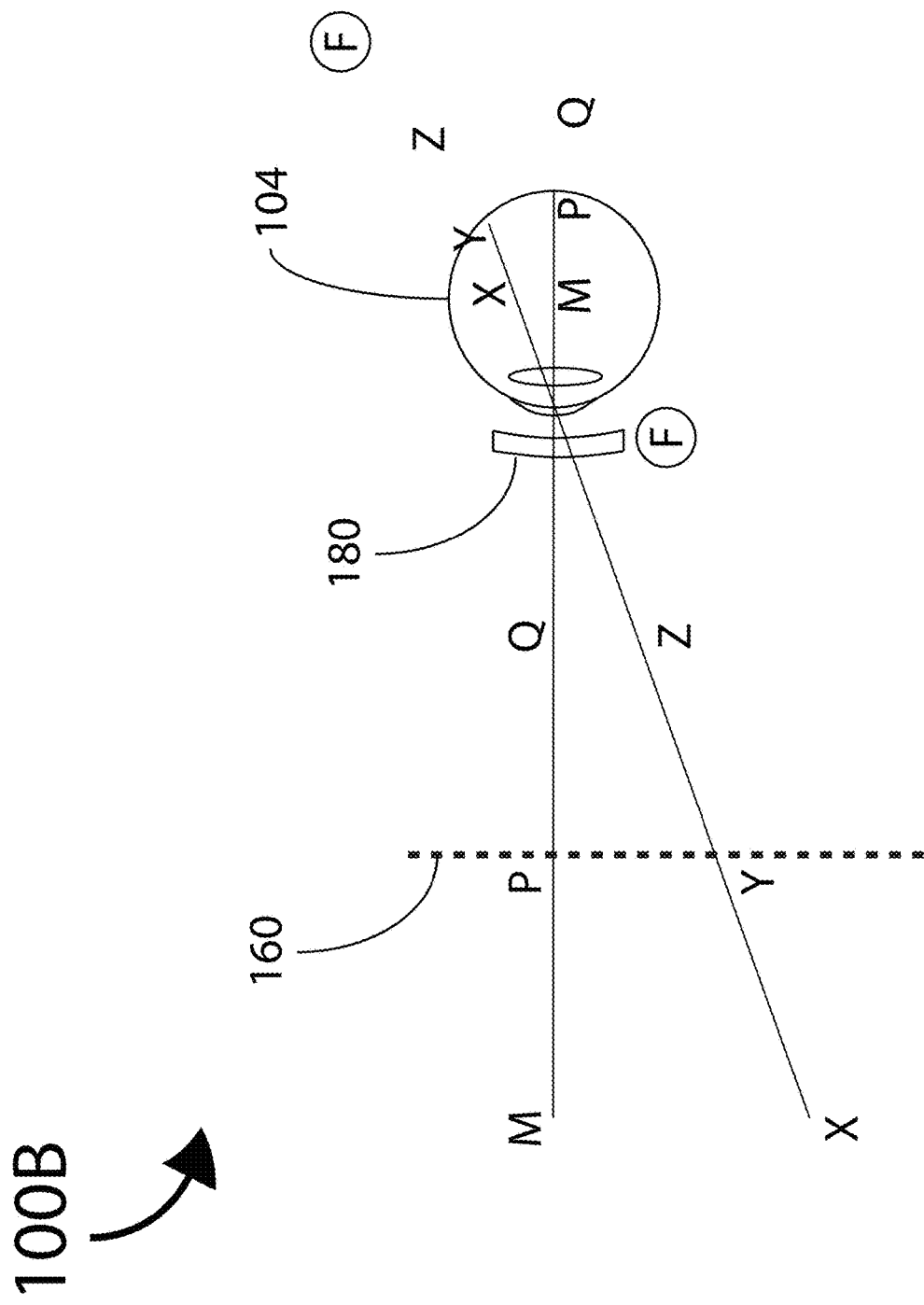
FIG. 1B shows what happens to the sharp focus image positions relative to the retina of a young myopic eye that is wearing a single element vision correction spectacle lens when the eye is fixating on object P and when different objects from the surrounding optical environment are imaged by the myopic eye with conventional vision correction. Object F represents the frame of the spectacle.

FIG. 1B shows what happens to the sharp focus image positions relative to the retina of a young myopic eye 104 that is wearing a single element vision correction spectacle lens 180 when the eye is fixating on central object P and when different objects (M, P, Q as central objects and X, Y, Z as peripheral objects) from surrounding optical environment are imaged by the myopic eye 104 with conventional vision correction onto its retina. On the optical axis of the myopic eye 104 with conventional vision correction, the eye is fixating on an intermediate central object P. In this case, central object M, which is further away from central object P, will form its image M in front of the retina at a relatively larger distance, and central object Q, which is closer than central object P from the eye 104, will form its image behind the retina at a relatively larger distance.

At the same time, paracentral and/or peripheral objects will also cast their images relative to the retina. If the distance of paracentral and/or peripheral object X is about the same as that of the central object M, an image of object X will form in front of the paracentral and/or peripheral retina also at a relatively large distance as in the case of object M. Object Y, which is at an object distance as that of object P as indicated by the dashed line 160, will cast its image Y on the paracentral and/or peripheral retina. Object Z, which is closer to the eye as object Q does, will cast its image Z behind the paracentral and/or peripheral retina also at a relatively large distance.

Note that in this case, the eye wire or rim of the spectacle frame, a peripheral object F, will be much closer to the eye than all other shown objects (M,P,Q and X,Y,Z), so its retinal image F will be even further behind the peripheral retina.

Figure 1C:
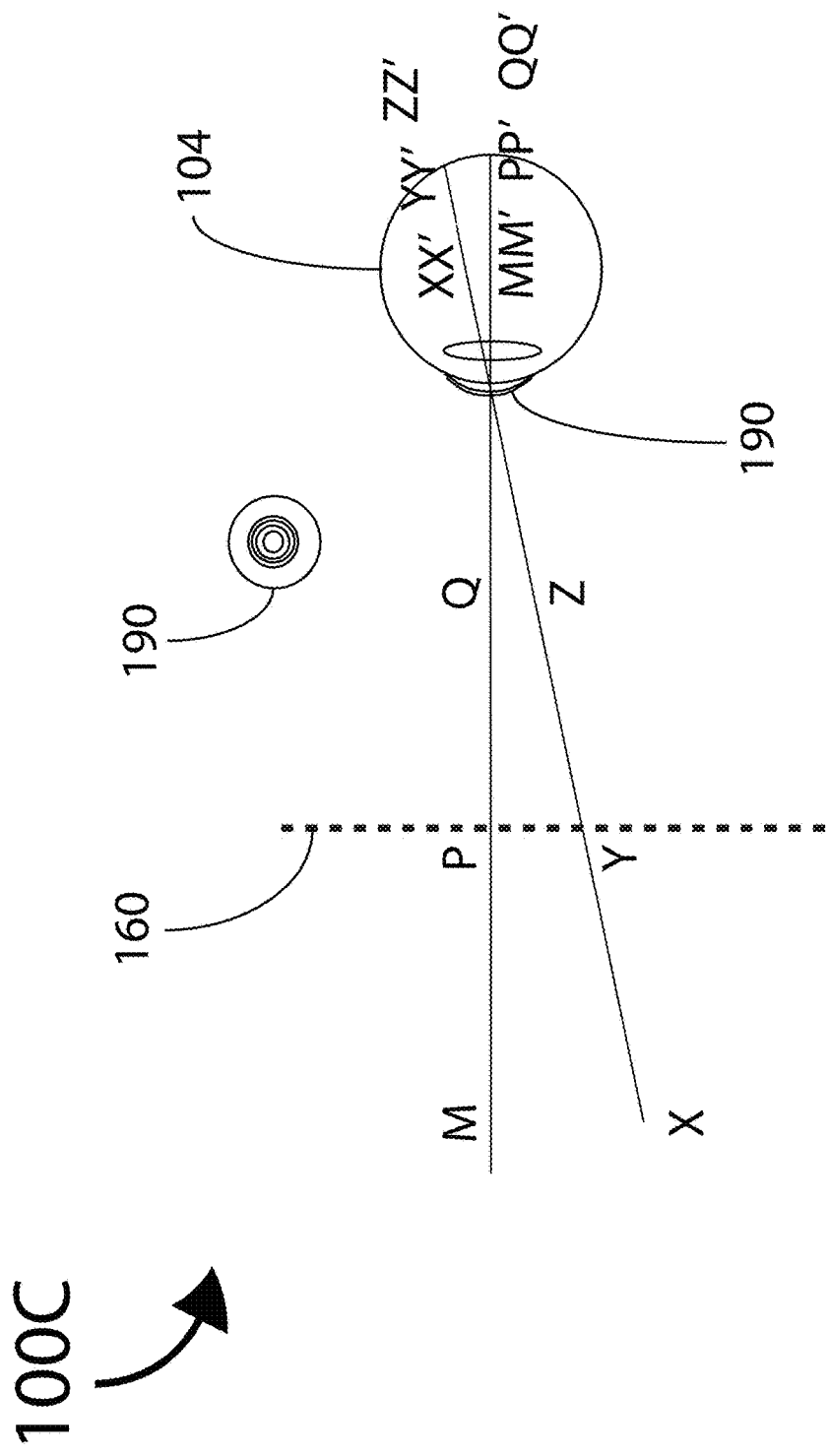
FIG. 1C shows what happens to the sharp focus image positions relative to the retina of a young myopic eye that is wearing a multi-focal contact lens when the eye is fixating on object P and when different objects from the surrounding optical environment are imaged by the myopic eye with the multi-focal contact lens correcting myopia and at the same time extending the depth of focus by creating multiple images of the same object at different focus through dividing the contact lens into different focusing zones.

FIG. 1C shows what happens to the sharp focus image positions relative to the retina of a young myopic eye 104 that is wearing a multi-focal contact lens 190 when the eye 104 is fixating on central object P and when different objects (central objects M,P,Q and paracentral and/or peripheral objects X,Y,Z) from the surrounding optical environment are imaged by the young myopic eye 104 onto its retina. The design of a typical multi-focal contact lens 190 is that it is divided into different concentric circular and/or annular ring zones with each zone having a different focusing power. As a result, one object after being imaged onto the retina by the contact lens 190 and the wearer's eye 104 will form multiple images (typical two or three) at different locations relative to the retina. Each zone can be designed to correct the wearer's refractive errors for either a far or a near object.

In this case, we assumed that for each object, two retinal images will be formed. So for a central object P, there are two retina images P and P' formed near the central retina. For central object M which is further away than central object P, it will also form two retinal images M and M' with both in front of the central retina at a relatively large distance. Similarly, for central object Q, which is closer to the eye than object P, it will form two retinal images Q and Q' behind the retina at a relatively large distance.

As for the paracentral and/or peripheral objects X, Y and Z, each will also form two retinal images, with X and X' in front of the paracentral and/or peripheral retina at a relatively large distance, with P and P' near the paracentral and/or peripheral retina, and with Q and Q' behind the paracentral and/or peripheral retina at a relatively large distance.

Figure 2A:
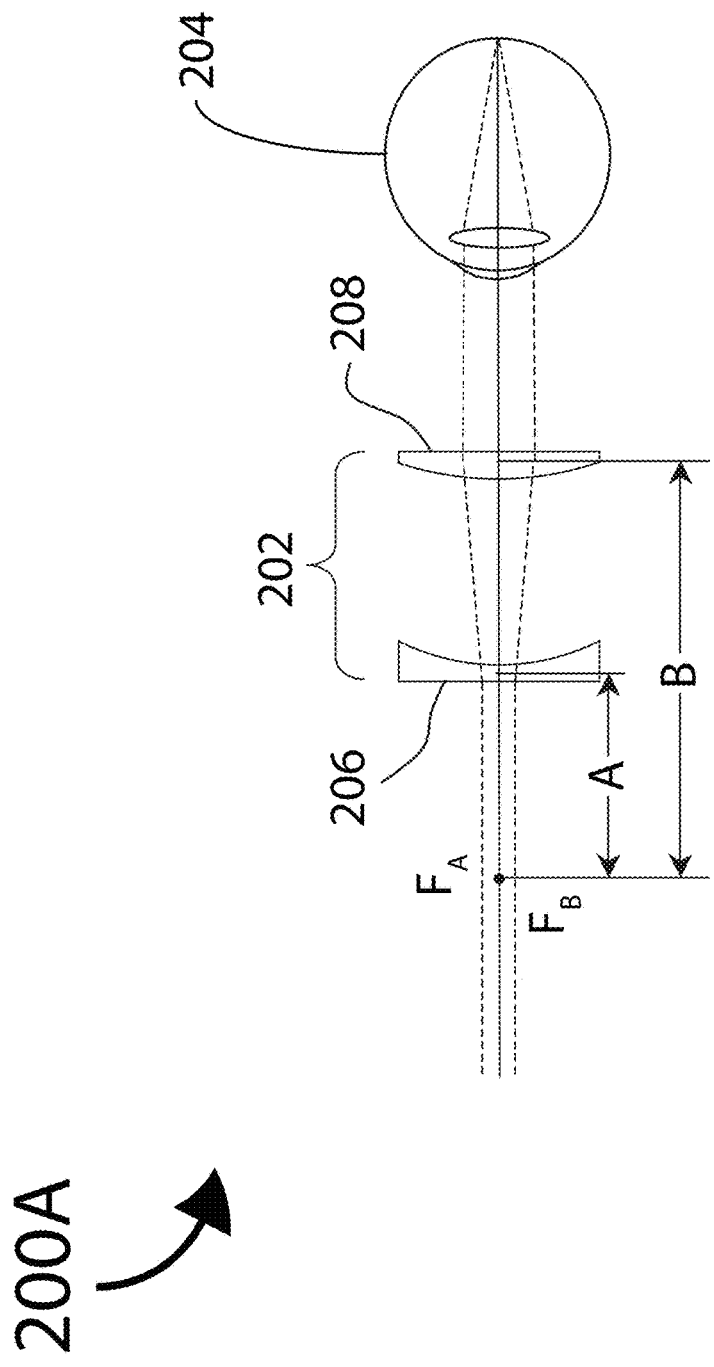
FIG. 2A shows a conventional reverse Galilean telescope placed in front of an eye when a distant object is optically relayed to an emmetropic presbyopic eye in which case the retinal image of the object will land on the retina. The positive eyepiece lens has a front focal point that overlaps with the front focal point of the negative lens.

FIG. 2A shows a conventional reverse Galilean telescope 202 placed in front of an eye 204. It is essentially an afocal Galilean telescope turned backwards to reduce the size of a distant object image rather than enlarge it. The positive eyepiece lens 208 has a focal length magnitude of B and its front focal point $F_B$ overlaps with the front focal point $F_A$ of the negative lens 206 having a focal length magnitude of A. The positive lens 208 re-collimates light rays coming from the virtual image point formed by the negative lens 206 at its front focal point in front of the positive eyepiece lens 208 and allows the eye 204 to focus at infinity. The optical magnification is equal to the ratio of focal length magnitude of the negative lens 206 and that of the positive lens 208, i.e. A/B, and since A is less than B so there is optical demagnification or minimization. Such a design has been used as viewer finder for cameras for a long time (see for example U.S. Pat. No. 5,483,381).

Figure 2B:
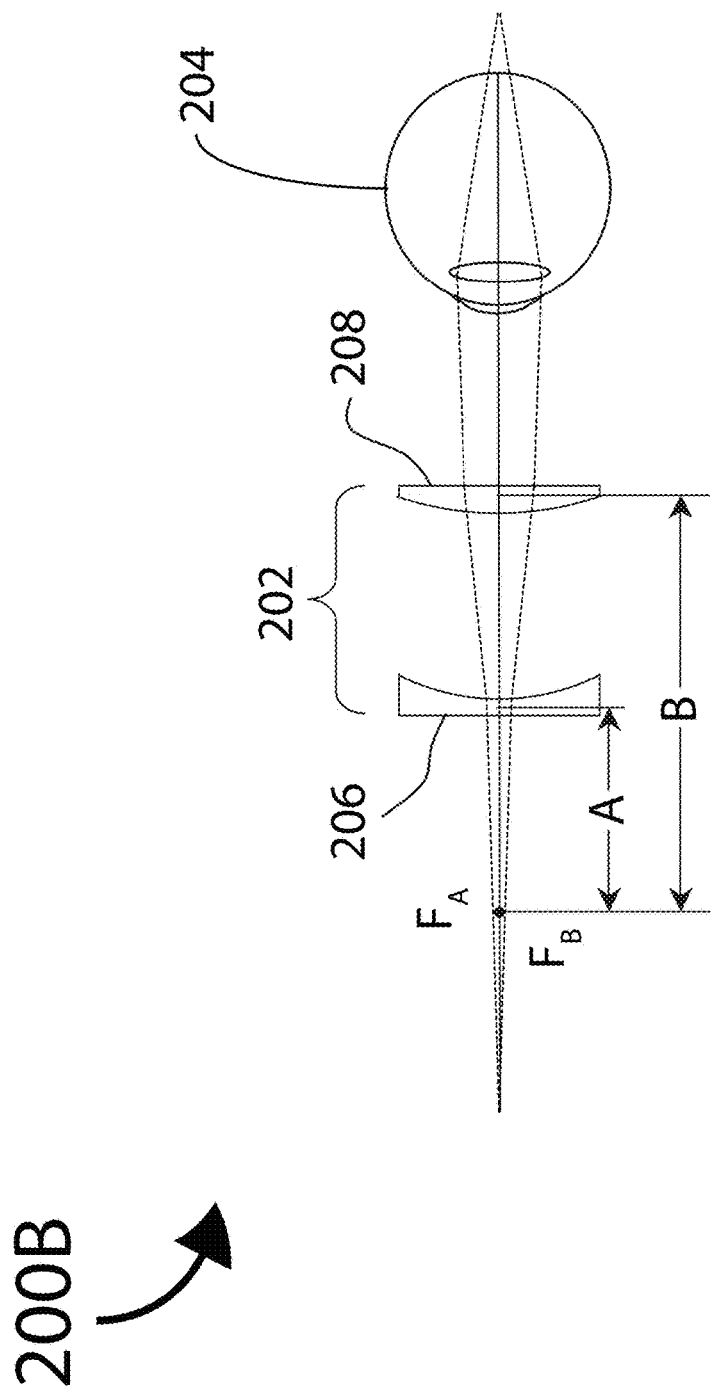
FIG. 2B shows a conventional reverse Galilean telescope placed in front of an eye when a near object is optically relayed to an emmetropic presbyopic eye in which case the retinal image of the object will land behind the retina. The positive eyepiece lens has a front focal point that overlaps with the front focal point of the negative lens.

Note that if the object light rays are not coming from a distance object, but from a nearby object as shown in FIG. 2B, they will be divergent after passing through the lens combination 202 comprising the negative lens 206 and the positive lens 208, and as a result, form an image behind the retina of an emmetropic eye 204, resulting in hyperopic defocus on the retina for an eye that does not have accommodation capability, such as an emmetropic presbyopic eye 204.

Figure 3A:
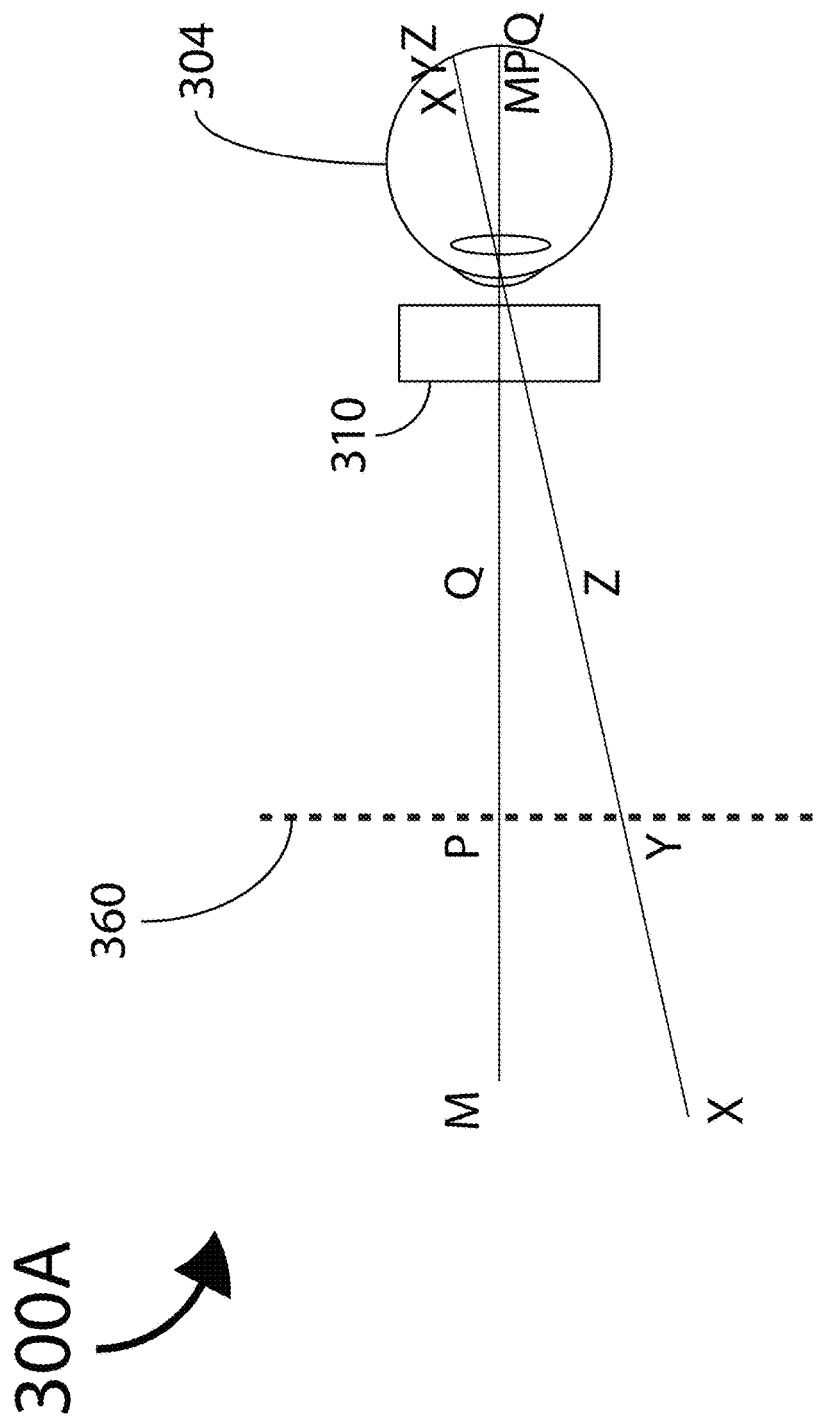
FIG. 3A illustrates a wearable Increased Resolvable Object Distance Range (IRODR) optical device in accordance with one embodiment of the present invention.

In accordance with the present invention, FIG. 3A shows what happens to the sharply focused image positions relative to the retina of a young person's eye 304 wearing an embodiment of an optical device 310, that advantageously increases the resolvable object distance range of several objects located at different distances along a visual angle distance thereby reducing focus accommodating demands especially when a user is visually fixating on a nearby object. Optical device 310 can be used as a vision aid for a range of visual impairments including myopia and presbyopia.

Figure 3B:
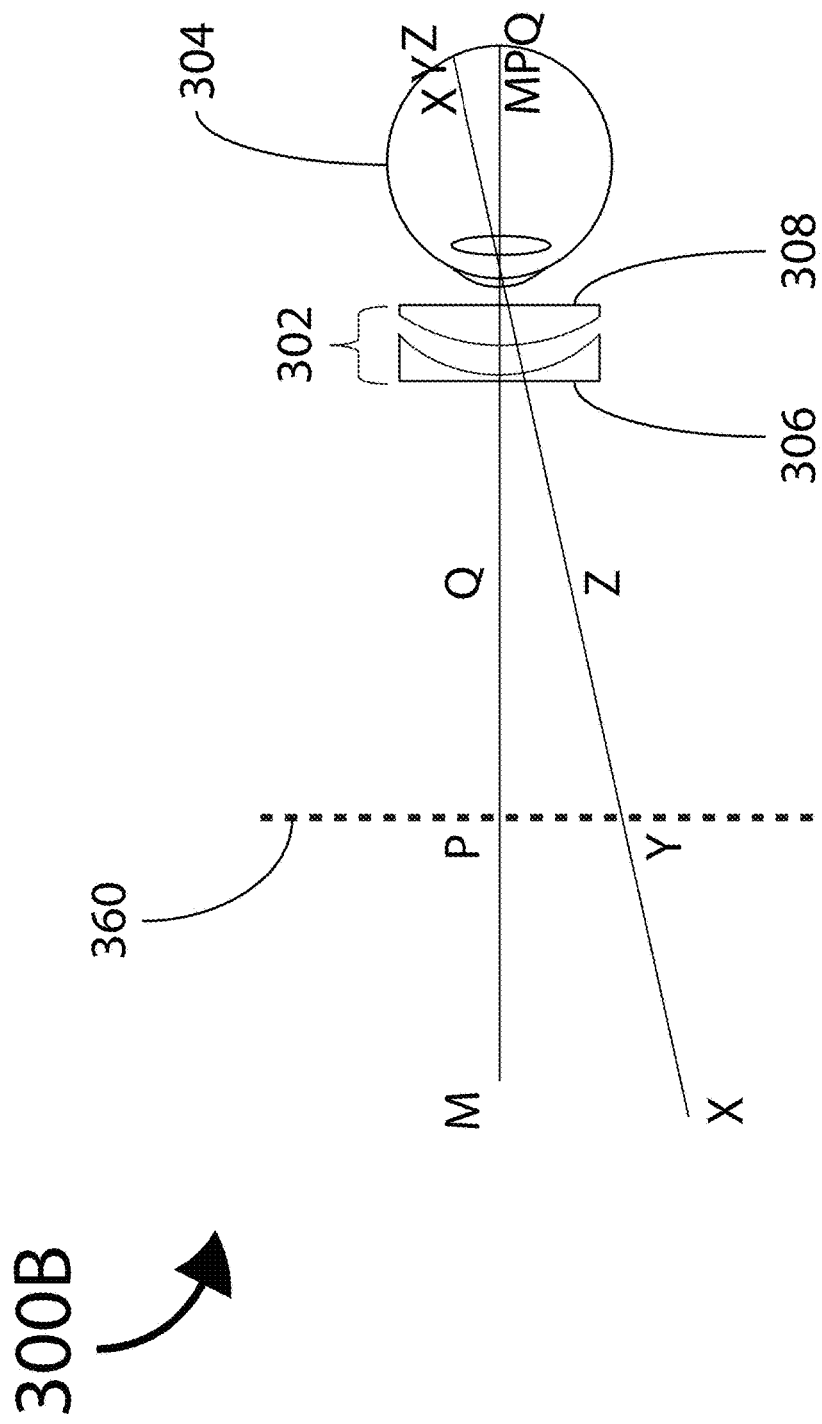
FIG. 3B shows what happens to the image positions relative to the retina of a young person's eye wearing an embodiment of the present invention when the eye is fixating on object P. The net effect of the IRODR lens combination is to optically push nearby objects further away from the eye and meanwhile, if the young eye is myopic the IRODR lens combination can also optically bring a faraway object closer to the eye as a single element vision correction lens does.

Referring now to FIG. 3B, the optical device 310 of FIG. 3A incorporates modified and rearranged lens elements from a reverse Galilean telescope to create an Increased Resolvable Object Distance Range (IRODR) lens combination 302 comprising a negative lens 306 and a positive lens 308. As will be described in more detail later, the net effect of the IRODR lens combination 302 is to optically push closer object further away from the eye and meanwhile, if the young eye is myopic the IRODR lens combination can also optically bring a faraway object closer to the eye as a single element vision correction lens does. In other words, the present invention can optical increase the resolvable object distance range, leading to an increase in the depth of field (or focus).

When different objects (M, P, Q as central objects and X, Y, Z as peripheral objects) from a surrounding optical environment are imaged by the eye 304 wearing an IRODR lens combination 302, a different situation in comparison to FIG. 1A to FIG. 1C occurs for the retinal images. Assuming again that the eye 304 wearing the IRODR lens combination 302 is fixating on a central object P, then the central object P will form its image P on the central retina. In this case, a central object M which is further away from central object P will form its image M in front of the central retina but at a relatively shorter distance from the retina and a central object Q, which is closer than central object P from the eye 304, will form its image Q behind the retina but also at a relatively shorter distance.

At the same time, paracentral and/or peripheral objects will also cast their images relative to the retina. If the distance of paracentral and/or peripheral object X is about the same as that of the central object M, object X will form an image X in front of the paracentral and/or peripheral retina but at a shorter distance from the retina. If the distance of paracentral and/or peripheral object Y is about the same as that of the central object P as indicated by the dashed line 360, object Y will form an image Y on the paracentral and/or peripheral retina. If the distance of paracentral and/or peripheral object Z is about the same as that of the central object Q, object Z will form an image Z behind the paracentral and/or peripheral retina but at a shorter distance from the retina.

So with the present invention, the signals that could possibly cause the eye to elongate, including accommodation and hyperopic defocus on the paracentral and/or peripheral retina, will be weaker than that when the same person is not wearing a lens or is wearing a single element vision correction lens or a multi-focus contact lens. To interpret this in a different way, if there is a range of retinal images that are relatively sharply focused near the retina such that to the eye, they are still resolvable to produce signal to the eye so the eye treat them as in focus, then corresponding to this range, the present invention can increase the range of objects in the object space that are still resolvable as not blurred by the eye when compared with prior arts.

Figure 3C:
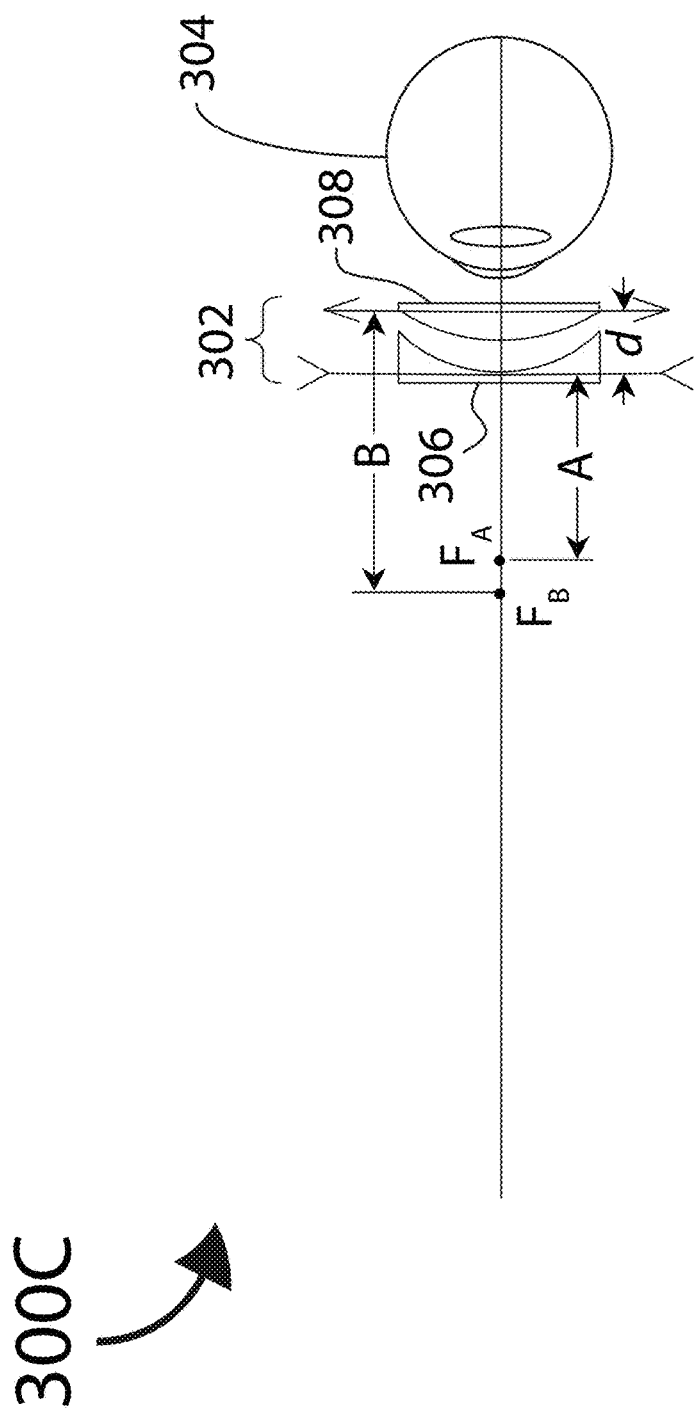
FIG. 3C shows one embodiment of the presently disclosed IRODR spectacle. A negative lens with its central zone having a strong refractive power is combined with a positive lens with its central zone having a somewhat less strong but positive refractive power where the front focal point of the central zone of the positive lens does not necessarily overlap with the front focal point of the central zone of the negative lens.

FIG. 3C shows one embodiment of the presently disclosed IRODR spectacle 302 in which the central zone of the present disclosed IRODR spectacle is represented by a negative lens 306 and a positive lens 308. As will be seen soon, the central zone of the design can substantially extend the depth of field (or focus) while not having issues related to single element based contact lens designs that extend the depth of field (or focus). This feature can directly be used to treat presbyopia and also acts as one of the several clinically proven approaches that can effectively control myopia progression. We will later discuss the paracentral and/or peripheral design that will not only provide benefits in terms of field of view control, but also function to provide features associated with the other clinically proven myopia progression control approaches.

In FIG. 3C, a negative lens 306 with a strong negative refractive power in its central zone is combined with a positive lens 308 having a somewhat less strong but positive refractive power in its central zone. The front focal point $F_B$ of the positive lens central zone does not need to overlap with the front focal point $F_A$ of the negative lens central zone. In general for a myopic eye and an emmetropic presbyopic eye, the paraxial front focal point $F_B$ of the positive lens is arranged in front of the paraxial front focal point $F_A$ of the negative lens. The strength of the refractive power of the central zone of both the negative lens 306 and the positive lens 308 is such that they can be arranged close enough to realize a practical compact design of a spectacle while also correcting the refractive error(s) of a patient eye 304. Preferably, the lens material used to make these two lenses is a lightweight high refractive index polymer such as those with a refractive index of around 1.74.

Such an arrangement can provide a number of features very desirable for presbyopia treatment and myopia progression control as will be discussed below.

To understand the basic principle of operation and practicality of the design, we assume that the central zones of the two lenses can be, to a first degree of approximation, treated as two thin lenses separated by a distance d. We can consider the image formed by the central zone of the negative lens 306 as the object for the central zone of the positive lens 308. We will firstly use the ray tracing method to find out where the final image is formed if an object is placed at some intermediate distance in front of the IRODR spectacle 302 outside the front focal point $F_B$ of the of the positive lens 308 which is outside the front focal point $F_A$ of the negative lens 306. We will then use the thin lens image formation equations to do some numerical analysis to discuss the basic properties of the presently disclosed IRODR spectacle for light rays that propagate paraxially through the central portion of the two lenses and to illustrate why such a design is beneficial in terms of presbyopia treatment and myopia progression control.

Figure 4A:
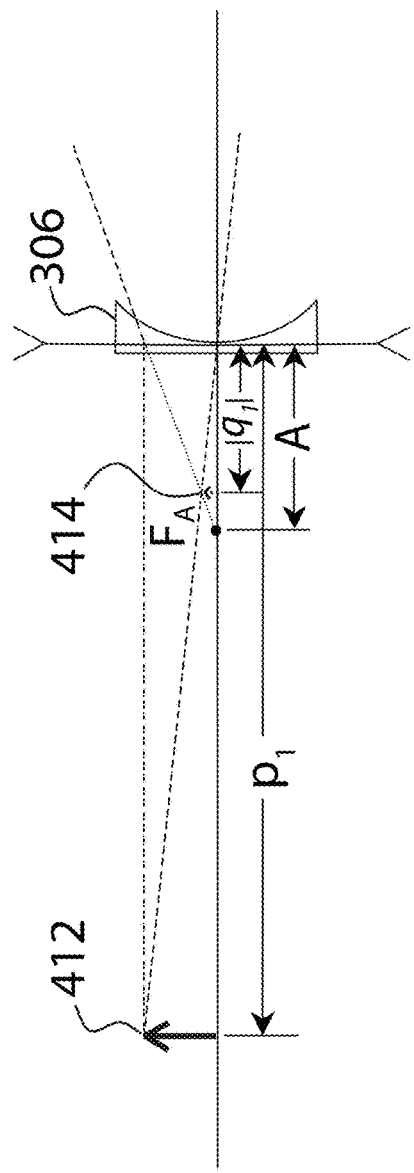
FIG. 4A shows the ray tracing method being used to find out the image position and image size formed by the negative lens of an object placed at a relatively near object distance from the negative lens.

FIG. 4A shows the ray tracing method being used to find out the image position and image size formed by a negative lens 306 of an object 412 placed at an object distance of $p_1$ from the negative lens 306. A light ray from a point on the top of an object traveling parallel to the optical axis toward the negative lens 306 will refract divergently such that its backward extension passes through the front focal point $F_A$ on the object side of the negative lens 306. A light ray from a point on the top of an object 412 traveling to the exact center of the negative lens 306 will continue to travel in the same direction. The image point 414 of the top of the object is the point where the backward extended refracted light ray intersects with the light ray that propagate through the center of the negative lens 306. Note that the image 414 is located inside the front focal point $F_A$ of the negative lens 306 with the magnitude of the image distance being less than the magnitude A of focal length of the negative lens 306.

Figure 4B:
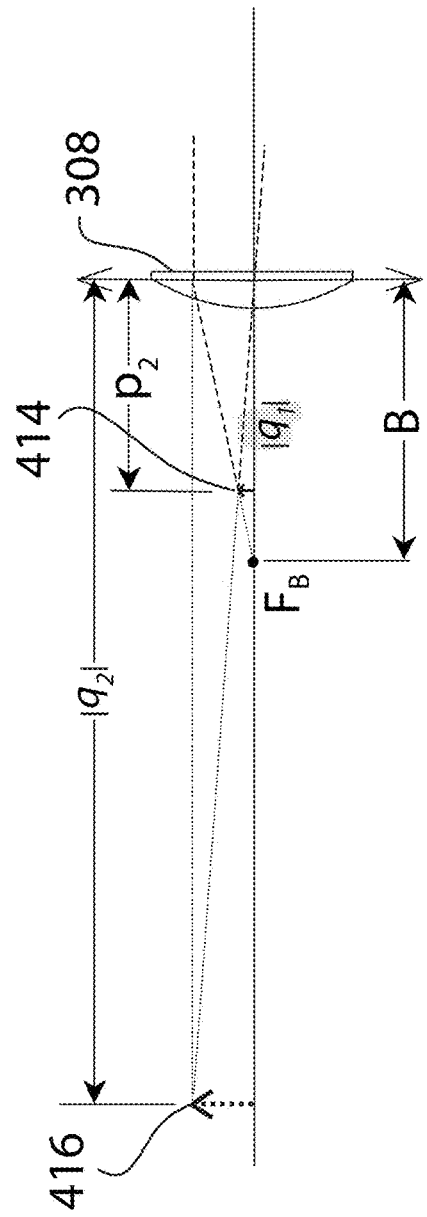
FIG. 4B shows the ray-trace diagram in finding out the final image position and size formed by the positive lens of the object formed as a virtual image by the negative lens but as the object for the positive lens.

FIG. 4B shows the ray tracing method being used to find the final image position 416 and image size formed by the positive lens 308 of the virtual object 414 (formed by the negative lens 306 as the image 414 but as the virtual object 414 for the positive lens 308). Note that since the front focal point $F_B$ of the positive lens is outside the front focal point FA of the negative lens as shown in FIG. 3B, the virtual object 414 as seen by the positive lens 308 (formed as the image 414 by the negative lens 306) is therefore within the front focal point $F_B$ of the positive lens 308 with $p_2$ being less than the magnitude B of the focal length of the positive lens 308, where $p_2$ represents the object distance relative to the positive lens 308. In this case the light rays will diverge after refracting through the positive lens 308. When refracted light rays diverge, a virtual image is formed.

A ray from a point on the top of the virtual object 414 (i.e. image 414 formed by the negative lens 306) traveling through the center of the positive lens 308 will continue to travel in the same direction. A ray from a point on the top of the virtual object 414 (i.e. image 414 formed by the negative lens 306) traveling in a direction that appears as it is from the front focal point $F_B$ of the positive lens 308 will be refracted and proceed parallel to the optical axis upon exiting from the positive lens 308. When these two light rays emerge from the right side of the positive lens 308 and are extended backward, they will intersect and the point of intersection is where the top of the final image 416 is. We will use $|q_2|$ to represent the magnitude of the final image distance relative to the positive lens 308. As can be seen, an enlarged virtual image 416 relative to the virtual object 414 of the positive lens 308 is formed.

Figure 5:
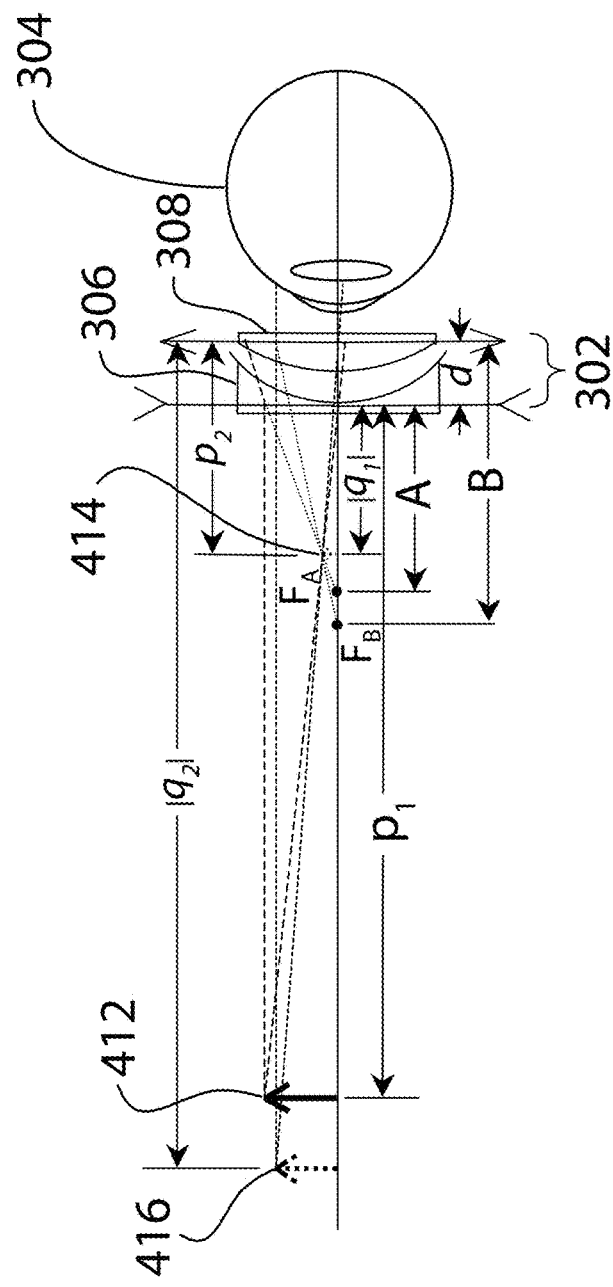
FIG. 5 shows the merging together of FIG. 3 and FIG. 4, illustrating that for a relatively close object, the final image position formed by the combination of the negative lens and the positive lens is positioned further away from the combination as compared to the original object position.

When we combine the two diagrams of FIG. 4A and FIG. 4B as shown in FIG. 5, we can see that in this particular case, the final image 416 formed by the IRODR combination 302 of the negative lens 306 and the positive lens 308 is further away from the original object 412. In the illustrated case, the final image 416 is smaller in size as compared to the original object 412.

Figure 6:
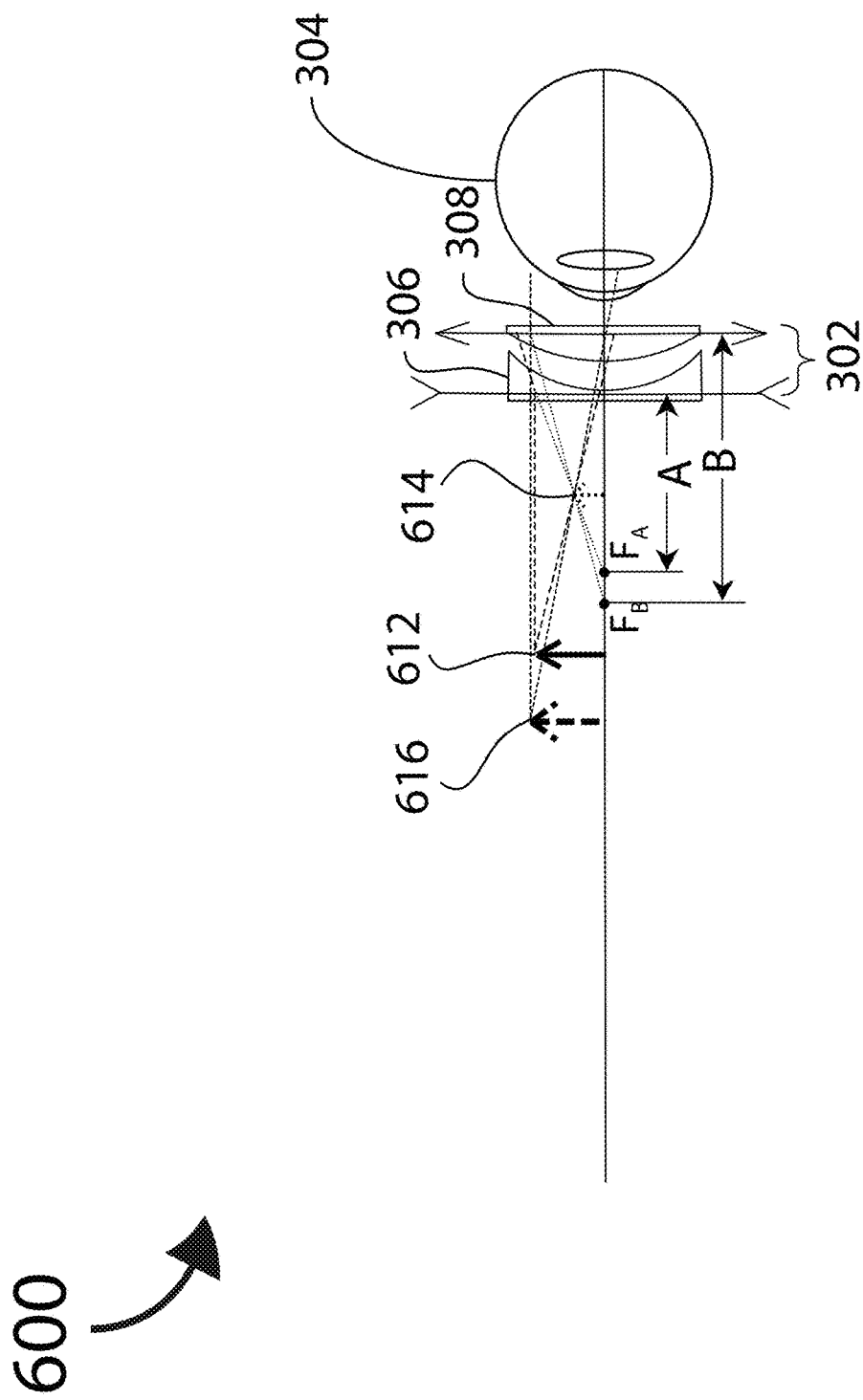
FIG. 6 shows the ray-trace diagram in finding the final image position and image size of an object that is closer to but still outside the front focal point of the positive lens which is outside the front focal point of the negative lens.

To find out what happens if the object is closer to but still outside the front focal point $F_B$ of the positive lens which is outside the front focal point $F_A$ of the negative lens, we have done ray tracing for such a case as shown in FIG. 6. It can be seen that in this particular case, the final image 616 is larger in size than the original object 612 but still, the position of the final image 616 is further away from the original object 612. Although with ray tracing, it is difficult to determine the exact relative position of the intermediate image 614 and the final image 616 with respect to the original object 612, one thing is obvious and that is, a nearby object 612 optically refracted by the presently disclosed IRODR spectacle 302 will appear to be further away from the eye 304 of a patient wearing such a spectacle.

In order to better understand the position and size of the final image in comparison to those of the original object over a large object distance range, we can use the thin lens image formation equations. Assuming that light rays travel from left to right toward a thin lens, the thin lens equation is $$\frac{1}{p} + \frac{1}{q} = \frac{1}{f}$$

wherein p is the object distance (from object to thin lens), is positive for a real object located to the left of the lens, and is negative for a virtual object located to the right of the thin lens, q is the image distance (from image to thin lens), is positive for a real image formed to the right of the lens, and is negative for a virtual image formed to the left of the thin lens, f is the focal length (from either front or back focal point to thin lens), is positive for a converging lens and negative for a diverging lens.

The optical magnification m produced by a thin lens is given by $$m = -\frac{q}{p}$$

If the magnification is negative then the image will be upside-down compared to the object. If the magnification is positive then the image will have the same orientation as the object.

Again, we consider the image formed by the negative lens as the object for the positive lens. Given that the first lens is a negative lens, we have $f_1 = -A$ where A (with a positive value) is the magnitude of the front focal length of the negative lens. Therefore, $$\frac{1}{p_1} + \frac{1}{q_1} = \frac{1}{f_1} = -\frac{1}{A}$$

$$q_1 = -\frac{1}{\left(\frac{1}{A} + \frac{1}{p_1}\right)} = -\frac{p_1 * A}{(p_1 + A)}$$

Because our object is real and on the left side of the negative lens, $p_1$ is positive. From the above equation and the fact that A is positive, $q_1$ is therefore negative and the absolute value of $q_1$ is $$|q_1| = \frac{p_1 * A}{(p_1 + A)}$$

This means that the first image formed by the negative lens is on the left side of the negative lens, and is a virtual image. Since $$\frac{p_1}{(p_1 + A)} < 1,$$

and therefore, $|q_1|<A$, this first virtual image is hence within the front focal point $F_A$ of the negative lens.

Also since the object is outside the front focal point $F_B$ of the positive lens which is outside the front focal point $F_A$ of the negative lens, we have $|q_1|<A<p_1$. As $q_1$ is negative, the first optical magnification associated with the negative lens is $$m_1 = -\frac{q_1}{p_1} = \frac{|q_1|}{p_1},$$

which is positive and less than one, meaning that the first image is upright and minimized relative to the object.

We can now treat this virtual image as the object of the positive lens and find out where the final image formed by the positive lens is. Note that the object distance to the positive lens is positive and is $$p_2 = |q_1| + d$$

where d is the separation distance between the negative lens and the positive lens, assuming both can be treated as thin lenses. Applying the thin lens image formation equation to the positive lens, we have $$\frac{1}{p_2} + \frac{1}{q_2} = \frac{1}{f_2} = \frac{1}{B}$$

Or $$q_2 = \frac{1}{\left(\frac{1}{B} - \frac{1}{p_2}\right)} = \frac{p_2 * B}{p_2 - B}$$

Our design is that the front focal point of the positive lens is outside the front focal point of the negative lens. Given the fact that the virtual image formed by the negative lens (which now acts as the object of the positive lens) is within the front focal point of the negative lens (which is within the front focal point of the positive lens), we can conclude that $p_2 = |q_1| + d$ is less than B, so $q_2$ is negative. Therefore, the absolute value of $q_2$ is $$|q_2| = \frac{p_2 * B}{B - p_2}$$

Meanwhile, since $B > |B - p_2|$, $|q_2|$ is thus greater than $p_2$. Therefore, the second optical magnification associated with the positive lens, $$m_2 = -\frac{q_2}{p_2} = \frac{|q_2|}{p_2},$$

is positive and greater than one. This means that final image formed by the positive lens is on the left side, is an upright virtual image, and is magnified relative to the intermediate image formed by the negative lens.

The relationship between the final virtual image distance referenced to the negative lens ($|q_2|-d$) and the original objective distance $p_1$ also referenced to the negative lens, is $$[(|q_2| - d)] = \left[\left(\frac{p_2 * B}{B - p_2} - d\right)\right] = \frac{p_1(AB + Ad + d^2) + Ad^2}{p_1[B - (A + d)] + A(B - d)}$$

Note that to determine if the final image is formed further away or closer relative to the original object, we need to compare the value of ($|q_2|-d$) with the value of $p_1$. The difference $[(|q_2|-d)-p_1]$ can be expressed as $$[(|q_2| - d) - p_1] = \left[\left(\frac{p_2 * B}{B - p_2} - d\right) - p_1\right] = \frac{p_1(AB + Ad + d^2) + Ad^2}{p_1[B - (A + d)] + A(B - d)} - p_1$$

As a practical example, we can choose the magnitude of the focal length of the negative lens to be A=30 mm, the magnitude of the focal length of the positive lens to be B=40 mm, and the separation distance between the two lenses to be d=9.8 mm. With such a selection of the two lenses and the arrangement, basically all practical nearby objects, like a computer screen and a cell phone screen held by a person, will generally be outside the positive front focal point $F_B$.

Figure 7:
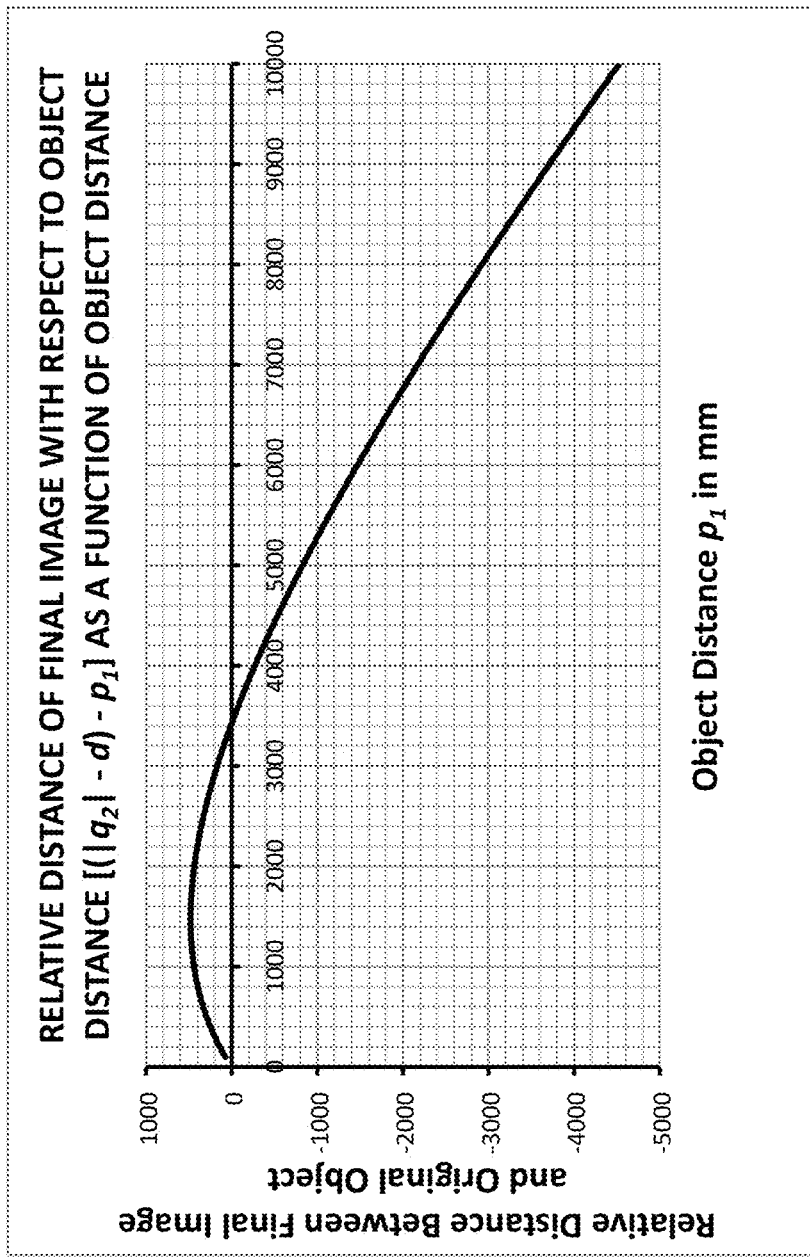
FIG. 7 shows a plot of the relative distance difference between the final virtual image and the original object as a function of the object distance over a distance range from 100 mm to 10000 mm or from 0.1 m to 10 m for a 30 mm focal length negative lens and a 40 mm focal length positive lens with a lens separation distance of 9.8 mm.

FIG. 7 shows a plot of the relative distance difference between the final virtual image and the original object, $[(|q_2|-d)-p_1]$, as a function of the object distance $p_1$ over an object distance range from 100 mm to 10000 mm or from 0.1 m to 10 m. It can be seen from FIG. 7 that the relative distance difference is positive for objects relatively close to the IRODR spectacle and negative for objects relatively distant to the IRODR spectacle. This means that nearby objects will be optically pushed further away from the IRODR spectacle and distant objects will be optically brought closer to the IRODR spectacle.

To better illustrate the relative change in distance, it is more informative to show the relative percentage in terms of the distance difference between the final image and the original object normalized to the original object distance and this percentage can be expressed as $$\frac{[(|q_2| - d) - p_1]}{p_1} = \frac{\left[\left(\frac{p_2 * B}{B - p_2}d\right) - p_1\right]}{p_1} = \frac{(AB + Ad + d^2) + \frac{Ad^2}{p_1}}{[B - (A + d)] + \frac{A(B - d)}{p_1}} - 1$$

Figure 8:
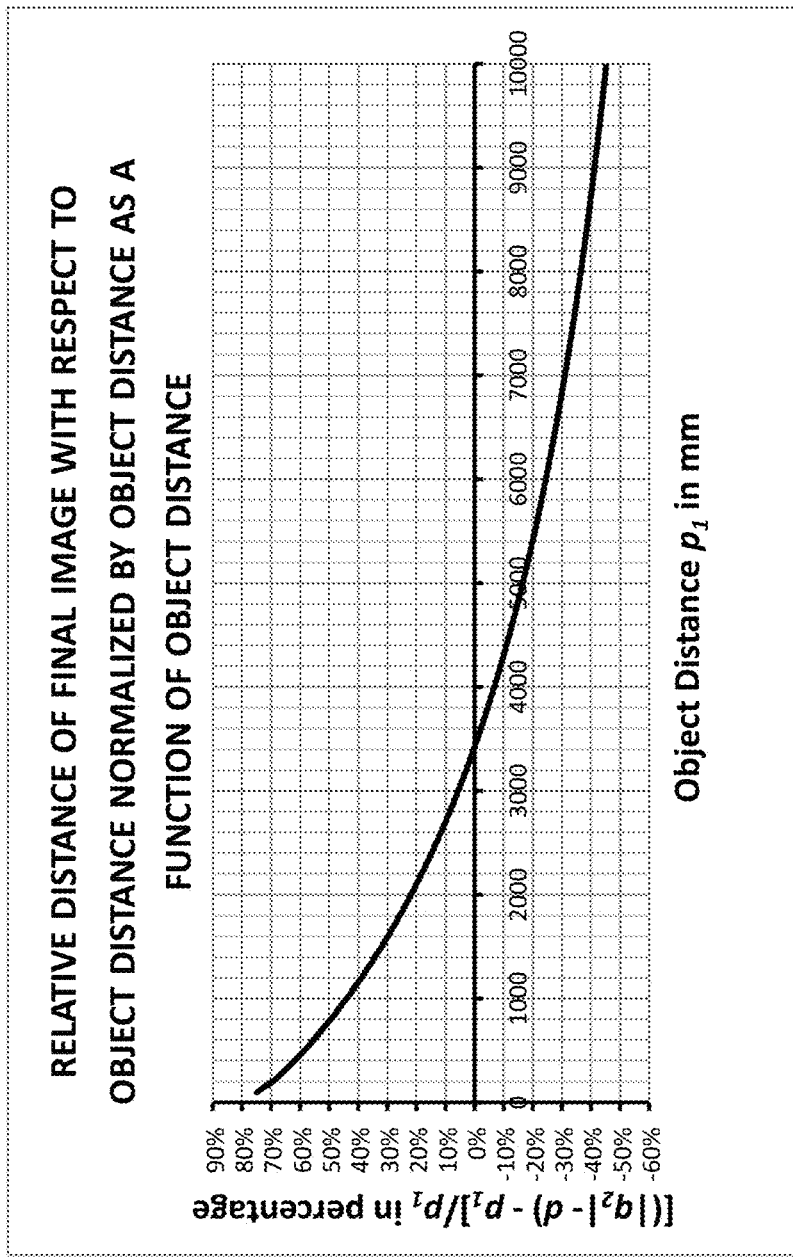
FIG. 8 shows the relative percentage of position difference between the final virtual image and the original object normalized to the original object distance, i.e.

FIG. 8 shows a plot of the relative percentage in position difference between the final virtual image and the original object normalized to the original object distance as a function of the original object distance over an object distance range from 100 mm to 10000 mm or from 0.1 m to 10 m.

It can be seen from FIG. 8 that for a very nearby object that is about 100 mm or 4 inches away from the IRODR spectacle, the image is pushed about 75% away from the original object position. FIG. 7 and FIG. 8 tell us that with the use of the IRODR spectacle, an object originally at 100 mm or 4 inches away will appear to come from a distance of about 175 mm or about 7 inches. As the object distance from IRODR spectacle increases, the relative pushed-away distance percentage drops. For an object at about 1 meter, its image is pushed outward by about 44%, so it appears to come from a distance of about 1.44 meters. More interesting is the fact that as the object distance further increases, the relative pushed-away distance percentage continues to drop until at a certain distance (3.4 meter in the current case), it drops to zero percentage. This means that for an object at 3.4 meters, its virtual image is also at 3.4 meters. More importantly, as the object distance further increases, the relative pushed-away distance percentage continues to drop below zero. A negative percentage means the final virtual image is closer than the original object. At an object distance of 10 meter, the relative percentage is −45% which means that the image is about 5.5 meters away from the IRODR spectacle.

At this moment, one may wonder what the overall optical magnification is over such an object distance range. To determine if the final virtual image is magnified or de-magnified relative to the original object, we need to find the overall optical magnification which is $$m = m_1 * m_2 = \left(-\frac{q_1}{p_1}\right) * \left(-\frac{q_2}{p_2}\right) = \frac{A * B}{(p_1 + A) * (B - d) - p_1 * A}$$

FIG. 9 shows the plot of the overall optical magnification as a function of the object distance over an object distance range from 100 mm to 10000 mm or from 0.1 m to 10 m. From FIG. 9, it can be seen that for very nearby object, there is an optical magnification greater than one, meaning that while a very near object is pushed away by the IRODR spectacle, the final virtual image is somewhat enlarged. At an object distance of around 1.4 meters, the final virtual image and the original object has approximately the same size. As the object distance further increases, the overall optical magnification drops below 100%, meaning the final virtual image will appear smaller than the original object.

By comparing FIG. 7, FIG. 8 and FIG. 9, it can be seen that for nearby objects like a cell phone screen with an object distance from about 100 mm or 4 inches to about 1000 mm or 3 feet, the present example can push the object away as a virtual image by a relative percentage from about 75% to about 44% while the virtual image would appear bigger than the original object. At an intermediate distance of around 3.5 meters, the virtual image will appear at about the same distance away as the real object does. In addition, at 3.5 meters where the image distance is equal to the original object distance, the size of the image is about 75% that of the original object which is equal to the ratio of A/B. For a distant object, the virtual image will appear quite closer to the eye (10 meter object appears to be 5.5 meter away) while the size of the virtual image is about half the size of the object. Given the fact that the distance is also reduced by about 50%, the net effect is that the visual angle or object field angle between the final virtual image and the original object is about the same. This means that a distant object imaged through the IRODR spectacle will appear approximately equally as resolvable as it would be without the IRODR spectacle.

It should now be clear that the presently disclosed IRODR spectacle can increase the depth of field (or focus) by pushing nearby object further away and bringing distant object closer. With this embodiment, if a slightly myopic presbyopic eye is originally able to resolve an object within an object distance range from 0.5 to 5 meter, then with the IRODR spectacle, the same person will be able to resolve object within an object distance range from 0.3 to 7.7 meter. The IRODR spectacle effectively functions as an extended-depth-of-field (or focus) device without the effect of contrast reduction and blurred background ghost images as some typical bi-focal or tri-focal or extended-depth-of-field (or focus) contact lenses would produce because these contact lenses are typically made with multiple concentric Fresnel zone type of rings to produce multiple focused images of an object at different image distances relative to the retina.

Another benefit of the presently disclosed IRODR spectacle is that it can effectively reduce the pupil size of the patient eye and therefore even further increase the depth of field (or focus) in addition to what has been discussed above, a property desirable for both presbyopia treatment as well as myopia progression control.

To see how this effective pupil size reduction is realized, we can refer to FIG. 10 which treats the patient eye pupil as an object with the two inward pointing arrows as shown in FIG. 10 representing the eye pupil. The light path is turned backward, i.e., the thin lens formula applies now to light rays travelling from right to left. In practice, the object which in this case is the pupil imaged by the cornea as represented by 1042 is positioned at a distance of about $p_3$=12 mm from the positive lens 308, where $p_3$=12 mm is a typical cornea apex to spectacle lens distance. Given that the central zone of the positive lens 308 can be approximated as a thin lens with a focal length magnitude of $f_B$=B=40 mm, the object 1042 is therefore way inside the focal length of the positive lens 308. As such the image 1044 formed by the positive lens 308 will be a magnified virtual image with a negative image distance of $q_3 = -|q_3|$. Using the principle that a parallel light ray from the edge of the pupil will be refracted by the positive lens 308 to travel towards its focal point on the other side (in this case the side further away from the eye) and the light ray that travels to the center of the positive lens 308 will propagate along the same direction, we can backward extend the refracted light rays to find the intersection point and hence to find the first image 1044.

Using the thin lens equation (now with light ray travels from right to left)

$$\frac{1}{p_3} + \frac{1}{q_3} = \frac{1}{f_B} = \frac{1}{B}$$

we can find the value of $q_3$ which is given by $$q_3 = \frac{1}{\left(\frac{1}{B} - \frac{1}{p_3}\right)} = \frac{p_3 * B}{p_3 - B} = \frac{12 \text{ mm} * 40 \text{ mm}}{12 \text{ mm} - 40 \text{ mm}} \cong -17.14 \text{ mm}$$

We can then treat this first virtual image 1044 as the object of the negative lens 306 which has a focal length of $f_A = -A = -30$ mm. Given the separation distance between the positive lens 308 and the negative lens 306 is d=9.8 mm, the object distance with respect to the negative lens 306 is $p_4 = |q_3| + d = 17.14$ mm + 9.8 mm = 26.94 mm.

Again, using the thin lens equation $$\frac{1}{p_4} + \frac{1}{q_4} = \frac{1}{f_A} = -\frac{1}{A}$$

we can find the value of $q_4$ which is given by $$q_4 = \frac{1}{\left(-\frac{1}{A} - \frac{1}{p_4}\right)} = -\frac{p_4 * A}{p_4 + A} = -\frac{26.94 \text{ mm} * 30 \text{ mm}}{26.94 \text{ mm} + 30 \text{ mm}} \cong -14.19 \text{ mm}$$

Therefore, the overall optical magnification is $$m' = m_3 * m_4 = \frac{q_3}{p_3} * \frac{q_4}{p_4} = \frac{-17.14}{12} * \frac{-14.19}{26.94} \cong 0.75 = 75\%$$

This means that if the pupil 1042 is originally 4 mm in diameter, to the world outside the IRODR spectacle, the final image 1046 will be effectively only 3 mm in diameter. Given the fact that the magnitude of depth of field varies inversely with pupil diameter, if we assume that pupil diameter with or without a wearing a IRODR spectacle is the same, then the depth of field increase due to purely the pupil size effect will be 1/0.75=1.33. In other words, if a slightly myopic presbyopic eye is originally able to resolve object within an object distance range from 0.5 to 5 meter, with the IRODR spectacle that does not include the pupil reduction effect, the same person will be able to resolve object within an object distance range from 0.3 to 7.7 meter. The depth of field in this case is 7.7−0.3=7.4 meter. But with the pupil reduction effect, the depth of field will be further increased to 7.4/0.75=9.87 meter. Even if the nearby-still-resolvable object distance remains the same, the person will be able to resolve object within an object distance range from 0.3 to 9.57 meter. In other words, the depth of field effectively doubled from the original 0.5 to 5 meters to about 0.3 to 10 meters.

In addition to the advantages associated with the substantial increase in the depth of field which is obviously beneficial in treating presbyopia as well as in controlling myopia progression, another advantage of the design (as an embodiment of the present disclosure) is that by changing the separation distance between the negative lens and the positive lens, within a certain limited range, a distant or intermediate object can be optically tuned to appear as coming from a desired distance and therefore the IRODR spectacle can be easily tuned to cater for different needs while maintaining the benefit of extended depth of field.

To illustrate this property, let us first take a look at how a single element negative lens can be used to treat myopia. A relaxed myopic eye without wearing a prescribed negative lens can only focus on an object at some near distance range. The reason why a negative lens can treat myopia is that the negative lens can optically bring a distant object closer to the eye by forming a virtual upright image at that near distance range. However, when an object such as a computer screen or a cell phone screen is no longer distant but nearby, the negative lens will form a virtual image even closer to the eye. If the eye has no accommodation capability like in the case of a myopic presbyopic eye, then the image formed by the eye will land behind the retina. In other words, there will be hyperopic defocus on the retina or the image on the retina will be a hyperopically blurred image. In such a case, the presently disclosed IRODR spectacle with extended depth of field can obviously provide help in treating presbyopia.

For example, if a presbyopic eye is slightly myopic such that wearing a negative lens with a diopter value of 1.0 D will enable the patient to see a distant object about 10 meters away clearly with best focus. This would mean that without any spectacle, the patient can form on the retina a best focused image of an object at a distance of about 1.0 meter away. One desired IRODR spectacle design, as one embodiment of the present disclosure, would be to optically relay an object at about $p_1$=10 meter away to appear as a virtual image at about $|q_2|$=1.0 meter away. Using the equation that relates the final virtual image distance to the original object distance as shown below $$[(|q_2| - d)] = \left[\left(\frac{p_2 * B}{B - p_2} - d\right)\right] = \frac{p_1(AB + Ad + d^2) + Ad^2}{p_1[B - (A + d)] + A(B - d)}$$

we can substitute $p_1$=10 meter=10000 mm, $|q_2|$=1 meter=1000 mm, A=30 mm, and B=40 mm into the above equation to find out the desired lens separation distance d, i.e.

$$[(1000 - d)] = \frac{10000(30 * 40 + 30d + d^2) + 30d^2}{10000[40 - (30 + d)] + 30(40 - d)}$$

Solving for d, we have d≅8.57 mm. FIG. 11 shows such a special case in which with the separation distance d=8.57 mm, and the relationship between the relative percentage of position difference between the final virtual image and the original object normalized to the original object distance, $$\frac{[(|q_2| - d) - p_1]}{p_1},$$

is plotted as a function of the original object distance $p_1$ over an object distance range from 100 mm to 10000 mm or from 0.1 m to 10 m. In such a case, very nearby object at a distance about 100 mm or 4 inches from the IRODR spectacle will still be pushed further away by about 43% while a distant object at 10 meters away will be brought much closer by 90% to a virtual image distance of about 1 meter.

As a comparison to the case of a single element prescription lens that is also used to bring a 10 meter away object to one meter. We can use the single element thin lens equation $$\frac{1}{p} + \frac{1}{q} = \frac{1}{f}$$

and substitute p=10000 mm, q=−1000 mm to obtain f≅−1111 mm. We can then use the relationship that $$|q| = \frac{p * |f|}{P - f} = \frac{1111p}{p + 1111}$$

to obtain the relationship between the relative percentage of the position difference between the final virtual image and the original object normalized to the original object distance, $$\frac{[|q|-p]}{p} = \frac{1111}{p+1111} - 1,$$

as a function of the original object distance p over an object distance range from 100 mm to 10000 mm or from 0.1 m to 10 m. In FIG. 11, this relationship is plotted as a dashed curve in order to compare with the case of the presently disclosed IRODR lens combination.

As can be seen, for an object at 10 meters, both the single element prescription lens and the presently disclosed IRODR lens combination can all bring the object 90% closer to the eye to make it appear as coming from 1 meter away. However, the single element negative lens will also bring a nearby object further closer to the eye as the relative percentage is always negative, whereas the presently disclosed IRODR lens combination will push a nearby object away from the eye because within certain nearby object distance range, the relative percentage is positive. More importantly, if the object is a nearby object such as a cell phone held by a young child at a typical distance of about 200 mm or 8 inches, the presently disclosed IRODR lens combination can push the object further away by about 30% to make it appear as coming from about 260 mm or more than 10 inches, whereas in the case of the single element myopia correcting negative lens case, the object will be brought closer to the eye by about 15% to make it appear as coming from 170 mm or slightly less than 7 inches. This 90 mm or close to 4 inches virtual image distance difference can mean a lot to myopia progression because in the single element myopia correction negative lens case, the image shell formed by the patient eye will much more likely land behind the retina even if there is accommodation, whereas in the IRODR case, accommodation will much more likely make the image shell land on the retina.

In the IRODR case, if the standard myopic correction prescription lens is 2.0 Diopter, the calculated corresponding IRODR lens separation distance will be d=7.16 mm. If the standard myopic prescription lens is 3.0 Diopter, the calculated corresponding IRODR lens separation distance will be d=5.87 mm. Note that these are very practical values because although with thin lens assumption, the variation range of the separation distance d can be from 10 mm to 0 mm, in practice, the lens will have certain thickness which will limit the separation distance variation range on the small value side.

This feature is beneficial in that it can enable a doctor to fine tune the prescription at the time when a patient is testing a custom made anti-myopia IRODR spectacle. Also if standard negative and positive lenses are made as a kit to cater for different myopic eyes, the total number of discrete positive and negative lenses can be less. For example, the step in discrete lens refraction power selection can be every 0.5 Diopter or even every 1.0 Diopter. In addition, the same lens pair can also be reused if there is a relatively small change in the spherical refractive error of a patient after wearing the IRODR lens for some period of time. All these will substantially reduce the cost as compared to standard single vision correction spectacles which are generally discarded after one to two years of use once there is myopic progression.

Note also that the net effect of moving the negative lens closer to the positive lens is to increase the separation distance between the front focal point of the positive lens relative to that of the negative lens, which will make the overall refraction of the combination having a net negative refractive power, thus offering the capability to correct the spherical refractive error of a myopic eye.

On the other hand, if the eye is hyperopic, the positive lens can be moved further away from the negative lens to make the front focal point of the positive lens land behind the front focal point of the negative lens, which will make the overall refraction of the combination having a net positive refractive power, thus offering the capability to correct the spherical refractive error of a hyperopic eye.

The above discussion clearly indicates that with the use of the presently disclosed IRODR spectacle, by controlling the separation distance between the negative lens and the positive lens, the same basic design that can increase the depth of field (or focus) substantially can also be utilized to treat presbyopic myopia (or hyperopia) in addition to controlling myopia progression.

If the eye is not presbyopic as in the case of young children who have accommodation capability, then depending on the amplitude of accommodation, there will be an object distance range over which the eye can still accommodate. Beyond that object distance range, the eye will no longer be able to accommodate. This limited accommodation range can cause accommodation lag.

One theory on why myopia progresses even when a negative prescription lens for best distance vision correction is worn by a myopic patient is that with limited accommodation range, the patient wearing such a prescription lens will still not be able to fully bring a nearby object like a computer screen or a cell phone screen to sharp focus on the retina, meaning that the nearby object will be sharply focused behind the retina even with maximum accommodation. This can send a signal to the eye to cause its axial length to further elongate, resulting in myopia progression.

Based on the above theory, many clinical trials have been conducted to control or slow myopia progression using contact lenses that offer bi-focal or tri-focal or multi-focal or extended depth of focus properties. These clinical trials seem to have proven that by correcting distant refractive error and also at the same time extending the depth of field (or focus), myopia progression can indeed be controlled or slowed. Therefore, the presently disclosed IRODR spectacle has the potential to treat myopia progression at a younger age before a child is able to easily and safely wear a contact lens while not having those undesirable effects associated with single element bi-focal or tri-focal or extended-depth-of-focus contact lenses such as blurred background ghost images.

It should be noted that instead of controlling the separation distance between the negative lens and the positive lens, another embodiment in treating myopia or control myopia progression is to either change the central zone refractive power of the positive lens or to change the central zone refractive power of the negative lens or to simultaneously change the central zone refractive power of the positive lens and the central zone refractive power of the negative lens. The ultimate goal is to optically relay a distant object to a desired distance at which a relaxed eye would, without wearing any spectacle lens, form a sharply focused image on the retina. Note that when the refractive power of the positive lens is decreased (or increased), it is equivalent to say that the focal length magnitude of the positive lens is increased (or decreased), which means that the front focal point of the positive lens is moved forward (or backward) relative to that of the negative lens. Similarly, when the refractive power of the negative lens is increased (or decreased), it is equivalent to say that the focal length magnitude of the negative lens is decreased (or increased), which means that the front focal point of the negative lens is moved backward (or forward) relative to that of the positive lens.

It should be noted that in the above analysis using either ray tracing diagrams or thin lens image formation equations, we have treated the negative lens and the positive lens as a thin lens and in practice these lenses are generally not very thin lenses so the analysis is only an approximation. Therefore, there are differences between reality and the above analysis. Although more accurate analysis can be done using, for example, Zemax or other optical ray tracing or simulation software, we would like to mention that with reduction to practice, we have built prototypes that demonstrated performance that is generally in agreement with the above analysis results.

So far, we have only discussed some embodiments related to the central zone of the presently disclosed IRODR spectacle. Before we move on to discuss embodiments related to the design of the paracentral and peripheral zones of the presently disclosed IRODR spectacle, we would like to point out a few other features that can be associated the design of the central portion of the presently disclosed IRODR spectacle as variations in terms of embodiments.

Firstly, in terms of the optical design of the central zone of the negative lens and the positive lens, there can be many possible lens shape design options. For example, the negative lens can be bi-concave, or plano-concave, or negative meniscus and the positive lens can be bi-convex, plano convex and positive meniscus. Any possible combination should work. Although for better handling and cleaning of the IRODR lens combination by the end user, it is preferable to have the less curved surface on the outside of the combination, the more curved side of either the negative lens or the positive lens can be either on the outer side or inner side. A preferred embodiment would be a negative meniscus lens in combination with a positive meniscus lens with the more curved surfaces of each of the two lenses arranged in between the two lenses so the outer two surfaces are similar to those a conventional single element vision correction lens with less curvature.

Secondly, in terms of the practical refractive powers of the negative lens and the positive lens, given the fact that each lens, especially the negative lens with a relatively strong net refractive power, has a certain thickness even just for the central zone, the design is preferably such that the overall thickness of the IRODR combination is within the range from 5 mm to 30 mm while the relative ratio of the focal length magnitude of the positive lens over that of the negative lens FB/FA is preferably within the range from 125% to 175%, more preferably on the 125% side.

To make this happen and also to ensure that there is significant extension in the depth of field (or focus) while the virtual image is not de-magnified too much as compared to the original object size; the refractive power of the central zone of the negative lens is preferably selected to have a focal length magnitude of 10 mm to 40 mm or an absolute magnitude of refractive power between 25 Diopter to 100 Diopter. Associated with this preferred refractive power magnitude range of the central zone of the negative lens, the focal length magnitude of the central zone of the positive lens is preferably from 12 mm (2 mm longer relative to the 10 mm focal length magnitude of the negative lens) to 65 mm (25 mm longer relative to the 40 mm focal length magnitude of the negative lens) or an absolute magnitude of refractive power between about 15 Diopter to about 83 Diopter.

Thirdly, in terms of correcting the refractive errors of a patient eye, the design of the central zone of the two lenses can also include the correction of cylindrical refractive error or astigmatism in addition to spherical refractive error, or pure myopia and hyperopia. In one embodiment, the IRODR combination is designed to have astigmatism correction feature made on any one of the optical interfaces. Preferably, the astigmatism correction means is implemented by shaping one or both of the outer two relatively less curved surfaces of the IRODR combination so the inner surfaces are dedicated to depth of field (or focus) extension and also spherical refractive error correction. This may make the manufacturing or fabrication of the lenses more streamlined and more cost effective. In another embodiment, the outer two surfaces both have astigmatism or cylinder power and the net overall astigmatism or cylinder power is tuned by rotating the two lenses. As a result, the IRODR combination can realize both spherical and cylindrical refractive power tuning with the separation distance dedicated to spherical refractive error correction tuning, and the orientation angles of the two lenses dedicated to cylindrical refractive error correction tuning.

Fourthly, in terms of correcting not only refractive errors of a patient eye but also higher order aberrations of the patient eye, the design of the central zone of the two lenses can also include the correction of higher order aberrations in addition to spherical refractive error (or myopia and hyperopia) and cylindrical refractive error (or astigmatism). In one embodiment, the IRODR combination is designed to have astigmatism correction and higher order aberration correction features made on any one of the optical interfaces. Preferably, the astigmatism correction and higher order aberration correction means is implemented by shaping one or both of the outer two relatively less curved surfaces of the IRODR combination.

It should also be noted that the design of the central zone of the presently disclosed IRODR spectacle should not be limited to spherical surface designs but should include other designs like aspherical designs and even freeform designs. In practice, aspherical designs might be more preferred as this will result in less spherical aberration and also less distortions at least for the central vision. Also, the design of the negative lens and the positive lens does not need to be limited to singlet designs and either or both can be an achromatic doublet with chromatic and spherical aberration reduction taken into consideration if needed.

It is interesting to note that most of extended-depth-of-field (or focus) designs for presbyopia treatment have been found to also offer myopia progression control effect. The link between myopia progression control and presbyopia treatment seems to relate to the fact that a presbyopia patient basically has no accommodation capability, while reducing the degree of accommodation need or demand in the case of an emerging or low myopia patient reduces the chance that near object will form an image shell behind the retina due to accommodation lag or insufficient accommodation capability to bring the image shell from behind the retina to the retina.

So far, we have only discussed the central zone designs of the presently disclosed IRODR spectacle. As for the design of the paracentral and peripheral zones, they can affect other features related to the overall optical effect of the IRODR spectacle that a patient can experience, such as distortion, overall field of view and the image shell position relative to the paracentral and peripheral retina. As will be discussed shortly, certain designs will benefit presbyopia treatment more while other designs will benefit myopia progression control more.

Note that if the central zone designs are all spherical surface based and are extended all the way from the center to the peripheral of the IRODR combination which is one embodiment of the present disclosure, such a spectacle will generally enable wide field of view capability within a central (and paracentral) retina area that the eye would cover without the IRODR spectacle. What this means is that if the eye has tunnel vision with only the central (and/or paracentral) portion of the retina responsive to incoming light, then by wearing such a IRODR spectacle, a wider field of view will be covered by the same central (and/or paracentral) retina area. This property to enable the central (and/or paracentral) retina area to view a wider field of view has not only the benefit of optically relaying wider object field to within the most effective central and/or paracentral retina for most effective myopia progression control, but also the potential in assisting patient with retinitis pigmentosa, glaucoma, and some AMD (Age-related Macular Degeneration).

Note also that while extending the depth of field (or focus) and simultaneously correcting the refractive errors (or even higher order aberrations) can address the key issue related to presbyopia as well as myopia progression control to some extent, these central zone related approaches have only explored some of several clinically proven effective means that can control myopia progression. Using the presently disclosed IRODR spectacle with proper design of the paracentral and/or peripheral zone(s) of the spectacle, the other clinically proven effective means can also be explored. So we will now move on to discuss the optical designs of those embodiments.

As is well known to those skilled in the art, when the eye becomes more myopic, it becomes more prolate, thus the anterior-posterior length increases without a change in the equator. This results in a more hyperopic periphery. Traditional vision correction lenses will correct the central retina leaving the periphery more hyperopic, i.e., image shell in the periphery is behind the retina. The amount of hyperopic defocus increases when looking at nearby object during accommodation.

It has been clinically shown that the paracentral and/or peripheral retina has a greater influence than the central region of the retina or the macula to blur and ocular growth. By reducing peripheral hyperopia, one can alter central refractive development and reduce the rate of progression of myopia. More interesting is the fact that peripheral addition lenses designed to correct the distance centrally with a paracentral and/or peripheral add power can effectively slow myopia progression. The net effect of such a lens design will move the image formed at the paracentral or peripheral retina forward, leaving the image myopically defocused on the paracentral and/or peripheral retina, thus generating a visual stimulus to slow ocular growth.

As one embodiment of the presently disclosed IRODR spectacle, while the central zone of the IRODR combination is designed to fully correct for distance or intermediate distance vision, the paracentral zone of the IRODR combination is designed with overall net add or plus power relative to that of the central zone to increase hyperopic correction from the center moving outward in any direction to cover at least the paracentral zone. In other words, myopic defocus is induced in the paracentral retina. Note that what is meant by paracentral retina in this disclosure is the retina area that has the most effect outside the central retina or fovea/macula in terms of controlling myopia progression or eye length growth. Typically when this paracentral retina area is transferred to the spectacle plane about 12 mm in front of the cornea apex in terms of light ray coverage area, it corresponds to an annular ring zone on the spectacle lens with an inner diameter of about 10 mm and an outer diameter of about 20 mm.

FIG. 12A shows one embodiment of the presently disclosed IRODR spectacle with a paracentral and peripheral zone design that is not something a conventional reverse Galilean telescope would have. In this embodiment, the negative lens 1206 has a plano or less curved front surface 1252 while its back surface 1254 has a strongly concave aspherical surface such that the paracentral and peripheral zone of the lens does not induce negative spherical aberration. The positive lens 1208a has a convex spherical front surface 1256a and a plano or less curved spherical or spherical plus cylindrical back surface 1258. As a result, there is net positive spherical aberration over the whole lens area in addition to refractive error correction prescription for the central fovea or macula. This positive spherical aberration effectively means that paracentral and/or peripheral light rays that enter the eye pupil and land on the paracentral and/or peripheral retina will be focused closer to the ocular lens compared to central vision light rays. In other words, this IRODR design will form image shell of distant paracentral and/or peripheral object in front of paracentral and/or peripheral retina and/or have effect in correcting paracentral and/or peripheral hyperopia.

Note that by making the outer most two surfaces plano or less curved, the two strongly curved surfaces are contained inside the IRODR combination while the two outer surfaces are easier to handle and clean. With such a combination design, the IRODR spectacle will not only correct the central refractive errors but also induce myopic defocus in the paracentral (and/or, if needed, peripheral) retina, while, at the same time, extend the depth of field (or focus). In other words, a paracentral (and, if needed, peripheral) image shell will be formed in front of paracentral (and/or peripheral) retina, thus creating myopic defocus or myopic blur on paracentral (and/or peripheral) retina, which is one of the other clinically proven effective means to slow or prevent myopia progression. In one embodiment, the aspheric design of the more strongly curved back surface 1254 of the negative lens 1206 can be controlled in such a manner that the net add power in the paracentral (and/or peripheral) zone of the overall IRODR combination is about 2 to 3 Diopters and the addition of the power is gradual from the central zone to the paracentral zone (and/or peripheral) in a similar way as a standard progression addition spectacle lens does but in all radial directions. In addition, in the central zone, the aspheric design can also, if needed, minimize or remove spherical aberration for the central vision. Note that the design of the central zone does not need to be restricted to having a net positive spherical aberration. There are many other designs that can induce myopic defocus on the paracentral and/or peripheral retina. For example, the same overall refraction effect can also be achieved if the paracentral (and/or peripheral) zone of the front surface of the positive lens is gradually more strongly curved to over compensate the negative spherical aberration induced by the negative lens. In other words, as there are four optical interfaces that can be manipulated to control the overall refractive properties of the IRODR lens combination, there are many ways to design one or more of these surface profiles to achieve the same goal.

FIG. 12B shows an embodiment where in addition to the aspheric surface design of the back surface 1254 of the negative lens 1206, the front surface 1256*b* of second the positive lens 1208*b* also has an aspheric surface design. In such a design, the asphericity of the back surface 1254 of the negative lens 1206 and the asphericity of the front surface 1256*b* of the positive lens 1208*b* can be controlled to gradually produce the desired add power in the paracentral zone while also to gradually produce a transition of the overall net power from the paracentral zone to a desired value of the peripheral zone of the overall IRODR combination.

It should be noted that with the designs as shown in FIGS. 12A and 12B, the effect of extending the depth of field (or focus) applies to both the central vision and also the paracentral (and/or peripheral) vision although the extension in the paracentral (and/or peripheral) retina can be different than that in the central retina.

FIG. 12C shows a comparison of the sharp focus image positions of some optical environment objects (M, P, Q as central objects and X, Y, Z as peripheral objects) as they land on the retina in the case of an eye wearing an IRODR spectacle disclosed in FIGS. 12A and/or 12B as shown in the upper portion of FIG. 12C, versus the case of an eye wearing a conventional single element vision correction spectacle lens as shown in the lower portion of FIG. 12C. In both cases, it has been assumed that the eye is fixating on the central object P. In the IRODR case, the central optical environment objects M, P, and Q are imaged to the central retina region with their sharpest focus image positions closest to the central retina and their relative distances from each other short. The paracentral optical environment objects X, Y and Z are imaged to the paracentral retina region with their sharpest focus image positions still very close to the paracentral retina, but may not be as the same as in the central retina case. In comparison to the single element vision correction lens case as shown in the lower portion of FIG. 12C, the same central optical environment objects M, P and Q, when imaged to the central retina region, will have their sharpest focus image positions more separated from each other around the central retina compared to the IRODR case. Similarly, the same paracentral optical environment objects X, Y and Z, when imaged to the paracentral retina region, will have their sharpest image focus positions also more separated from each other around the paracentral retina compared to the IRODR case.

In one embodiment, the peripheral zone of the negative lens can have a gradually less and less curved surface while the peripheral zone of the positive lens also has gradually less and less curved surface. As the curvature reduces towards the peripheral edge, the design can be such that while the overall IRODR combination net optical refractive power is the same as a single element vision correction lens would provide to the patient, the depth of field (or focus) enhancement effect will gradually decrease and the optical demagnification effect as seen by other observers when they look at the patient eye through the IRODR spectacle lens will gradually become that of a single element vision correction lens.

This can be achieved by keeping the difference in the magnitude of the focal lengths of the negative lens and positive lens to be about the same so the separation or gap distance between the negative lens and the positively lens remains the same, while the ratio of the focal length magnitude of the positive lens over that of the negative lens gradually reduces from the highest value at the center toward a value closer to one at the peripheral edge.

In such a way, the pupil of the wearer's eye will be effectively reduced to help enhance the depth of field (or focus) for central vision, while the outer portion of the eye (from iris, to limbus, to eye lids, schelera and canthus) will gradually have close to normal perceived size as a single element vision correction lens would have when viewed by outside observers. A huge upside of such a design is that cosmetically, the wearer's eye when viewed by an outside observer will not be too much minimized or distorted so the spectacle will be more acceptable by a potential wearer.

In another embodiment, the design is such that while the spherical equivalent image shell is formed in front of the paracentral retina, the sagittal image shell is sharply focused on the paracentral retinal area. These various means should be considered as different embodiments of the present invention.

Note that although the peripheral zone can have the same effect as the paracentral zone (i.e. forming an image shell in front of the peripheral retina), in other embodiments, the design can be such that only the paracentral zone outside the central zone has the design to form an image shell in front of the paracentral retina while the peripheral zone has a different profile and/or effect. This is because the paracentral retina is most effective in terms of controlling the elongation of the eye, while the peripheral retina is mainly used to sense the presence and movement of peripheral optical environment objects.

In terms of the difference between the peripheral zone and the paracentral zone, the peripheral zone can have many other possible designs. For example, the peripheral zone can function to just correct the refractive error as a single element lens does. In such a case, as one embodiment, the positive lens can have a peripheral zone that is like a parallel plate piece of glass and the peripheral zone of the negative lens can have a negative refracting power almost the same as a single element prescription lens. Again, such a design will be cosmetically more acceptable to a potential wearer because the peripheral zone of such an IRODR design will have the same optical magnification or demagnification as a single element vision correction lens would have when the wearer's eye is viewed by an outside observer.

Also the peripheral zone can have a prism structure like an annular axicon lens. As such, the function of the peripheral zone is to purely expand the field of view and FIG. 13 shows such an embodiment. Note that the peripheral zone of the either the negative lens 1306 or the positive lens 308 or both can be made with a prism structure like an annular axicon lens. So expanding the field of view can be accomplished with the prism structure 1362 of the peripheral zone 1365 of the negative lens 1306 alone or that of the positive lens 308 alone or those of both the negative lens 1306 and the positive lens 308.

Note also that in these designs, the optical magnification or demagnification from the central zone to the paracentral zone to the peripheral zone can change continuously or discontinuously and as a result certain degree of optical distortion is intentionally created. This intentional distortion is something that ordinary single element vision correction lens will try to avoid but in this invention, it is used to bring benefit to presbyopia treatment and myopia progression control.

Note also that the transition in the optical refraction profile or distribution can be gradual or non-gradual and discontinuous or continuous. There can be multiple steps or multiple gradual transitions. In addition, the refractive index of the lens material can also be varying which include design of gradient refractive index distributions.

In one embodiment, the relative net refractive power increases continuously or discontinuously across a first transition zone from the central zone to the paracentral zone and then further increases continuously or discontinuously across a second transition zone from the paracentral zone to the peripheral zone. In another embodiment, the relative net refractive power increases continuously or discontinuously across a first transition zone from the central zone to the paracentral zone and then decreases continuously or discontinuously across a second transition zone from the paracentral zone to the outer edge of the peripheral zone.

Since the increase in the depth of field (or focus) and the need to make nearby object optically pushed away is only needed for the central and part or all of the paracentral region, and the peripheral region of the retina is meant to sense presence or movement of peripheral objects, a key benefit of using the peripheral zone to expand the field of view is that with the central zone fully correcting the refractive error(s) and the paracentral zone creating an image shell in front of the paracentral retina that is most effective in controlling myopia progression, by expanding the field of view to create a desired degree of tunnel vision that covers the needed field of view, the eye will no longer tend to rotate in trying to look at a peripheral object. Instead, the design will likely force the patient head to move to re-center the object in order to look at the object more clearly. As a result, the design will be more effective in myopia progression control.

Note that the peripheral zone can also have a changing net refractive power that either gradually reaches a value as a single element vision correction lens would provide, or gradually reaches a value that is greater than a single element vision correction lens would provide, or gradually reaches a value that is less than a single element vision correction lens would provide. Depending on which area of the retina is most effective in terms of controlling myopia progression by rendering myopic defocus on such area, the paracentral zone size and degree of overall refractive power can be controlled accordingly. It is even possible that the overall size of the negative lens and the positive lens can be different.

Let us now take a look at one design that may benefit presbyopia treatment. Assuming that a presbyopic eye originally has sufficient field of view coverage (i.e. there is no tunnel vision), then there is no need to use the IRODR spectacle to increase the field of view coverage. There is also no need to introduce myopic defocus on the paracentral or peripheral retina like in the case of myopia progression control. As such, the paracentral surface curvature designs of the two lenses can be different. In one embodiment, the paracentral and peripheral zones have net aspherical or freeform optical designs such that minimum spherical aberrations are introduced. In addition, if there is a need for astigmatism correction, a cylinder design can also be employed (for example on one or both of the outer surfaces).

FIG. 14 shows one embodiment in which the negative lens 1406 has a plano or less curved front surface 1452 while the back surface 1454 is a substantially concave aspherical surface for the central and paracentral zones (1361 and 1363) such that these two zones (1361 and 1363) do not induce negative spherical aberration. The positive lens 1408 has a convex aspherical front surface 1456 for the central and paracentral zones (1361 and 1363) and a plano or substantially less curved back surface 1458 such that the central and paracentral zone (1361 and 1363) of the lens does not induce positive spherical aberration.

In the peripheral zone 1365 the net refractive power of the IRODR combination gradually reduces to a value as that of a single element prescription lens would have for the conventional treatment of myopia. If the presbyopic eye is emmetropic, there is no needed vision correction so the refractive power of the IRODR combination is basically about zero across the whole IRODR area. This design will result in a gradual change in the optical magnification/demagnification and depth of field (or focus) from the paracentral zone 1363 to the edge of the peripheral zone 1365. Since the increase in the depth of field and the need to make nearby objects optically pushed away is only necessary for the central fovea or macula, and the peripheral region of the retina is meant to sense the presence and/or movement of peripheral objects, the paracentral zone 1363 thus serves the function to reduce spherical aberration, while the peripheral zone 1365 will remove the possibility that double images of a peripheral object (one through the peripheral region 1365 of the IRODR spectacle and the other from outside the spectacle frame border) will be formed on the peripheral retina. The design will be ideal for the treatment of a myopic presbyopic eye. In the case of an emmetropic presbyopic eye, the net refractive power at the peripheral edge should be zero.

Again, the same overall refraction effect can also be achieved by manipulating the optical interface design(s) of any one or more of the optical interfaces or even the refractive index distribution of one or both lenses. It is preferable to make the negative lens 1406 less curved in the paracentral zone 1363 and especially the peripheral zone 1365 as such a design will enable one to reduce the overall thickness of the negative lens.

The design may need to require the negative lens 1406 to have a larger size than the positive lens 1408. Another possible embodiment is to design the IRODR spectacle to have panoramic curved peripheral zones as some sport sun glasses have.

FIG. 15 shows another embodiment of the present invention. In this embodiment, the back surface 1554 of the negative lens 1506 is concavely curved in such a way that from the central zone 1361 to the paracentral zone 1363 and then to the outer peripheral zone 1365, the relative overall refractive power has a net add power in the paracentral zone 1363 relative to the central zone 1361 and then a net decreasing power in the peripheral zone 1365 relative to the paracentral zone 1363. The purpose of making the peripheral zone 1365 having a net relative negative power is to expand the field of view.

Another way to achieve the same effect is to make the peripheral region 1365 of the positive lens 1508 gradually less curved or even gradually concavely curved and at the same time make the peripheral zone 1365 of the negative lens 1506 less curved so the overall thickness of the negative lens 1506 is reduced. In such a case, while the central zone 1361 of the IRODR combination corrects the refractive error(s) with an image of a distant or intermedia object sharply focused on the fovea or macula of a myopic eye like a single vision correction lens does. The paracentral zone 1363 makes the image of an object myopically defocused on the paracentral retina (i.e. the image shell is in front of the paracentral retina), and the peripheral zone 1365 can negatively bend any incident light rays more to expand the field of view.

To avoid double image formation on the peripheral retina of peripheral objects, the spectacle design can be such that the field of view outside the refractive combination of the IRODR spectacle is blocked. The benefit of such a design is that it can limit the tendency of eye ball or ocular movement relative to the IRODR spectacle because some degree of tunnel vision is intentionally created while a wide enough field of view is covered with only the central and paracentral region of the retina being able to receive light. In one embodiment, the peripheral region 1365 of the IRODR combination is apodized such that there is a gradual transition from full transparency at the border between the paracentral zone 1363 and peripheral zone 1365 and then to total opaqueness at the outer edge of the peripheral zone 1365.

Note again that the peripheral zone of the IRODR spectacle can be bent in the same way as a panoramic sun glass to not only cover a wider peripheral view without being blocked by the lens frame, but also make the overall spectacle look more like an augmented reality goggle so young children will be excited to wear their spectacles.

FIG. 16A shows another embodiment in which the peripheral zone 1365 of the negative lens 1606*a* is made with a Fresnel lens design so the overall thickness of the negative lens 1606*a* is reduced while the same goal to allow the peripheral portion of the retina to sense the presence of any peripheral object, especially the movement of peripheral object is achieved. Note that the same concept can be applied to the design of the positive lens 1608 as well as both lenses so the overall thickness of the IRODR combination can be made even thinner. By doing so, an even shorter focal length magnitude (or stronger refraction) of both the negative lens 1606*a* and the positive lens 1608 can become practical for selection in terms of combining them to make a compact IRODR spectacle.

FIG. 16B shows an embodiment in which the peripheral zones 1365 of both the negative lens 1606*b* and the positive lens 1608*b* are all made with Fresnel lens designs. This design can allow the use of stronger power negative lens 1606*b* and positive lens 1608*b* so the overall thickness of the IRODR combination can be further reduced when compared to FIG. 16A while the same ratio of the focal length magnitude of the negative lens 1606*b* over that of the positive lens 1608*b* for the central zone 1361 can be either maintained or changed gradually or step-wise to a desired value.

FIG. 16C shows an embodiment in which both the paracentral zone 1363 and the peripheral zone 1365 of both the negative lens 1606*c* and the positive lens 1608*c* are all made with Fresnel lens designs so the overall thickness of the IRODR combination can be even further reduced. In this design, even stronger power negative and positive lenses can be used while the same ratio of the focal length magnitude of the negative lens 1606*c* over that of the positive lens 1608*c* for the central zone 1361 can be either maintained or changed gradually or step-wise to a desired value.

A potential issue with the embodiments of FIGS. 16A, 16B and 16C is that the air space in between the two Fresnel design like optical refraction elements can trap moisture and with temperature changes, moisture condensation can occur to influence the transmission of light through the IRODR device or even cause reduction in the quality of the image landing on the retina. FIG. 16E shows an embodiment in which the space 1688 in between the two Fresnel design like optical refraction elements is purged with dry or low humidity inert gas such as nitrogen, argon or helium and sealed to avoid internal moisture condensation when there is sharp temperature change. Numeral 1699 shown in FIG. 16E identifies the "spacing seal" that functions to properly align the negative refractive element with respect to the positive refractive element, and also functions to contain the "dry or low humidity inert gas" thereby preventing contamination and escape. The spacing seal can be formed by thickening an edge of the at least one of the negative refractive element and the positive refractive element.

A potential issue associated with the design with air in between the negative refractive element and the positive refractive element as shown in FIGS. 16A, 16B, 16C and 16E is that the air or inert gas filled space associated gap distance can change more than desired due to various factors including temperature, pressure, stress/strain, or even aging over time. In addition, in order to maintain the rigidity of the overall assembly, the negative and positive refractive element will need to have a certain minimum thickness and hardness, which will result in an optically unnecessary overall thickness and weight.

To address the above issues, FIG. 16D shows an embodiment in which the air medium of FIG. 16C in between the negative refractive element and the positive refractive element is replaced with a solid state low refractive index medium, which is shown in FIG. 16D as the pattern-filled region 1698*d*. Such a design can bring a number of benefits. As one implementation approach of the embodiment shown in FIG. 16D, three solid state optical materials can be employed to form the IRODR device, with the middle material having a lower refractive index and the two outer materials each having a higher refractive index than that of the middle material. The two surfaces or interfaces of the intermediate optical medium in connection with inner side surfaces or interfaces respectively of the two outer optical media forms the negative refractive element and the positive refractive element that are separated from each other along the optical axis by a separation space and at a separation distance suitable for mounting on a spectacle. It should be noted that when we mention refractive indices of the negative refractive element and the positive refractive element, we are referring to the two outer optical media, although the refractions are effected at the interfaces in between the intermediate optical medium and the two outer optical media.

Appendices A and B illustrate some exemplary optical materials with their refractive indices (and Abbe numbers if known) that can be used to form the IRODR device as shown in FIG. 16D, including various optical polymers or resins that can be molded, or cured with UV light or heat or both.

In terms of manufacturing or fabrication, the two Fresnel interfaces that effectively function respectively as the negative refracting element and the positive refracting element can be directly formed in a number of sequences and the materials that can be used for such purpose include those listed in Appendices A and/or B. For example, the two Fresnel interfaces can be directly formed on the front and back surfaces of the middle low refractive index medium using, for example, compression/injection-molding, or casting, or imprinting, or scribing, or diamond turning, or 3D printing. This will enable a better or higher precision thickness control. For example, the low and high refractive index optical materials can acrylic or PMMA with a refractive index of about 1.49 and a glass transition temperature of about 105° C.

The next step of manufacturing or fabrication is to cover or fill the front and back grooved surfaces with a high refractive index optical medium. This can be achieved using various means. One example is to use compression/injection-molding or casting to overlay the high refractive index layer. In the injection molding case, as long as the thermal setting temperature of the high refractive index material is lower than that of the low refractive index material, the low refractive index material can maintain its previously molded shape. For example, the high refractive index material can be polystyrene which has a refractive index of about 1.58 and a glass transition temperature of around 100° C.

Alternatively, liquid based optical resins such as some of those shown in Appendices A and/or B can be applied to cover the grooves using, for example, casting, spray painting, spin-coating, dip coating followed by UV or thermal or chemical reaction curing to solidify the high refractive material. The outer surfaces of the high refractive material can be flattened using a flat solid surface and can even be lapped and polished to a desired shape or surface profile.

The outer most surfaces of the IRODR device can be made relatively flat so it has no or very small refraction power and the front and back high refractive index material can be formed with a thickness as small as practically possible as long as the grooves are covered. As a result, the overall thickness of the FIG. 16D embodiment can be further reduced in comparison to those of FIGS. 16A, 16B, 16C and 16E. In addition, if the overall thickness is limited by the central zone thickness, the central zone can also be designed to have Fresnel lens like design with a small number of grooves to further reduce the overall thickness.

As another manufacturing or fabrication approach, the two Fresnel interfaces can be made on two separate high refractive index media using such materials as those shown in Appendices A and/or B with high refractive index. For example, polycarbonate can be used which has a refractive index of about 1.59 and a glass transition temperature of about 140° C.

The two elements can then be sandwiched with a low refractive index medium (such as one of those shown in Appendices A and/or B) at a designed distance with the space between them initially filled with a liquid form of the filling material that can be solidified later. This approach may be less manufacturing friendly than the previous one as shrinkage can happen, when the filled-in optical medium is solidified and also air bubbles or voids may be more easily trapped inside the being-solidified low refractive index optical medium.

In term of the Fresnel concentric groove design, the steps of the grooves can be designed such that their sidewall direction is along a line 1696*d* pointing to the center of the eye globe. That is, the step angles or step sidewall conic surfaces of the Fresnel design all converge at a step convergence point 1605 approximately at the center of the eye globe.

This design will bring with it two benefits. The first benefit is that as the eye rotates to fixate on an object, the light rays from the object that enters the eye pupil to land on the macula region will almost all travel relatively parallel to the line of sight and also relatively parallel to the groove step sidewall(s) that fall(s) within the bundle of light rays entering the eye pupil. As a result, the influence of the groove steps to these light rays will be minimized, i.e. a minimum number of these light rays will be undesirably deflected or reflected by the groove step(s) to change their directions. The second benefit is that since the light refracting groove surfaces and the corresponding step sidewalls are all tilted outward with a large enough taper or draft angle, if injection/compression molding or casting is employed to make these structures, the molded or casted part(s) can be ejected from the mold regardless of whether these grooves are made on the low refractive index medium surfaces or the high refractive index medium surfaces.

Note that in FIGS. 16A, 16B, 16C, 16D and 16E, at least one surface of the interface of a non-central zone of at least one of the negative refractive element and the positive refractive element is a Fresnel surface, and wherein the separation space is substantially filled by an intermediate media with a refractive index lower than that of the at least one of two outer media that are respective associated with the negative refractive element and the positive refractive element.

One feature of the embodiments of FIGS. 16A, 16B, 16C, 16D and 16E is that the Fresnel-lens-like grooves do not need to have very small width. The total number of steps from the center to the peripheral can be relatively small in comparison to a typical Fresnel lens. The central region can have much less or even no grooves. The paracentral region can have some number of grooves and the peripheral region can have more grooves.

Note that discussions made on the curvature of the negative lens back surface and the positive lens front surface relating to the paracentral and peripheral zones for both presbyopia treatment and myopia progression control can all be applied to the various Fresnel lens design cases. In particular, in the embodiment of the FIG. 16D, the peripheral zones of both the negative refracting grooved optical interface and the positive refracting grooved optical interface can have a gradually less and less curved optical interface towards the peripheral edge. As the curvature reduces towards the peripheral edge, the design can be such that while the FIG. 16D design's net optical refractive power is the same as a single element vision correction lens would provide to the patient, the depth of field (or focus) enhancement effect will gradually decrease and the optical demagnification effect as seen by other observers when they look at the patient eye through the FIG. 16D design will gradually become that of a single element vision correction lens.

As discussed before, this can be achieved by keeping the difference in the magnitude of the focal lengths of the negative refracting grooved optical interface and the positive refracting grooved optical interface to be about the same while the ratio of the focal length magnitude of the positive refraction over that of the negative refraction gradually reduces from the highest value at the center toward a value closer to one at the peripheral edge.

In such a way, the pupil of the wearer's eye will be effectively reduced to help enhance the depth of field (or focus) for central vision, while the outer portion of the eye (for example, from iris, to limbus, to eye lids, sclera and canthus) will gradually have close to normal perceived size as a single element vision correction lens would have when viewed by outside observers. A huge upside of such a design is that cosmetically, the wearer's eye when viewed by an outside observer will not be too much minimized or distorted so the spectacle will be more acceptable to a potential wearer.

It should be noted that all the above IRODR lens combination designs can be mounted on a frame in the same way that a typical single element vision correction lens or a reading glass or a sun glass would be mounted except that the overall thickness of the IRODR spectacle will likely be slightly thicker. It should also be noted that with the use of light weight and high refractive index material to make the IRODR lenses, together with the use of light weight spacers or low refractive index material as shown in the case of FIG. 16D and the lens mounting frames, the overall weight of the spectacle will not be significantly increased. FIG. 17 shows such a case where the presently disclosed IRODR lens combination 1702 is mounted on a spectacle frame 1772.

In another embodiment, a bigger opaque band 1874 is deliberately created by making lens mounting section wider. This embodiment can remove double image of peripheral objects for the case in which the field of view is expanded and tunnel vision is created to make myopia progression control more effective. The width of the opaque region 1874 can be such that the field of view border as seen through the IRODR lens combination is just connected to the field of view outside the lens mounting frame. FIG. 18 shows such an embodiment. It should be noted that there are different ways to create tunnel vision. For example, the connecting tube portion of the lens mount that holds and spaces the two lenses can be made opaque. An apodized tunnel vision can also be created by making the region that would create double image of peripheral objects to have gradually darkening opaqueness.

In another embodiment, the design of the IRODR spectacle can also include a design similar to what a conventional bifocal lens or a conventional progressive addition lens would provide. In such a case, the overall refraction of the spectacle is such that as the patient wearing such an IRODR spectacle looks slightly downward to use the lower portion of the spectacle to look at nearby objects, the overall net refraction of the spectacle will make the nearby object better in focus on the central retina. FIG. 19 shows such an embodiment where in addition to those various designs discussed above, there is a net overall relative addition of plus refraction power in the shaded region 1992 relative to that in the center and upper portion of the IRODR spectacle. The transition to the add power can be discrete as in a typical bifocal lens case or gradual as in a typical progressive addition lens case.

Note that the bi-focal or progressive addition design can also be that the upper and central zones of the IRODR lens combination are configured to provide a net central and upper refractive power that corrects the refractive error(s) (including astigmatism) of a patient eye for distant or intermediate vision. And the lower zone(s) 1992 or a selected area in the lower zone of the IRODR combination have a net refractive power that is higher than the net refractive power of the upper and central zone to correct the refractive error(s) of a patient eye for near vision. In the bi-focal case the transition of the net refractive power from the upper and central zone to the lower zone is discontinuous. In the progressive addition case, there is a transition region linking the central zone and the lower zone and the transition of the net refractive power from the upper and central zone to the lower zone is continuous.

In addition to the above, the design can further be such that the central zone of the IRODR lens combination are configured to provide a net central refractive power that corrects the refractive error(s) (including astigmatism) of a patient eye for distant or intermediate vision. Outside the central zone, there is a paracentral zone that links to the upper peripheral zone and the lower zone, the net refractive power gradually increases in the paracentral zone from the central zone to create image shell in front of the paracentral retina when the patient looks straight at far or intermediate objects. In addition, the lower zone(s) or a selected area in the lower zone of the combination have a net refractive power that is higher than the net refractive power of the upper and central zones to correct the refractive error(s) of a patient eye for near vision. And within the lower zone or the selected area in the lower zone, there can also be gradual increase in the net refractive power towards the outer directions.

Note that the designs of the lower portion of the IRODR combination for nearby object can also be prismatic by itself or in addition to bifocal or progressive addition features with a prismatic power adapted to a child's physiology such as esophoria or exophoria. In addition, the power addition value can be different depending on the special case of a particular child although a 2.00 D addition has been shown to be the most efficient. In one embodiment, the discontinuity in refractive power transition is made on one of the two inner lens surfaces so the step is not on one of the two outer surfaces. In another embodiment, the lower near vision portion has a different optical minimization percentage than that of the upper distance vision portion.

Note that many different single element vision correction and reading glass lens spectacle designs can be directly applied to the presently disclosed IRODR spectacle designs. It should be noted that the present invention involves a pair of IRODR lens combinations that are mounted on a lens mounting frame to be worn by a patient to treat presbyopia and myopia progression with the central zone of the pair providing correction of refractive errors. There needs to be symmetry between the pair in terms of the frame and IRODR design.

It should also be pointed out that in terms of changing the separation distance between the two lenses, in addition to continuous changes, stepped discontinuous changes can also be employed in the same manner as 0.25 Diopter steps for conventional prescription lens designs.

In addition, one embodiment of the present invention is to automatically change the separation distance between the two lenses such that the overall net central refractive power of the IRODR combination can automatically adapt to indoor versus outdoor lighting conditions to enable automatic near versus far distant vision correction.

In this respect, light sensor(s) that is (are) responsive to surrounding light level and/or light spectral distribution can be designed inside the IRODR lens combination or on the spectacle frame of the invention. Solar cell(s) or battery (batteries) or replaceable battery (batteries) can also be designed inside the IRODR lens combination or on (or in) the spectacle frame to provide power to the light sensors as well as to drive a mechanism that can actuate a change in the separation distance between the two lenses. Note that an advantage of designing the light sensor and the solar cell inside the IRODR lens combination is that the light sensitive area can be kept relatively clean by the patient simply because the patient will tend to clean the spectacle lens regularly in order to see object clearly through the spectacle.

FIG. 20 shows an embodiment in which solar cells 2092 and light sensors 2094 are embedded in the frame 2072 of the IRODR spectacle together with electronics, firmware and an actuation mechanism (not shown) to determine if a patient wearing the spectacle is indoor or outdoor and hence to keep or actuate a change in the separation between the two IRODR lenses. Preferably, the mechanism used to activate the change in the separation distance between the two lenses is passive in the sense that once latched into position there is no energy need to maintain the position.

It should be noted that with the presently disclosed automatic actuation mechanism, for presbyopia treatment, a spherical negative lens and a spherical positive lens will be sufficient although aspheric designs can be better. In other words, there is no absolute need for the IRODR lens combination to have a paracentral and/or a peripheral zone that has relative net add or subtract refractive power(s) with respect to the central zone. However, for myopia progression control, it will be better for the IRODR lens combination to have a paracentral and/or a peripheral zone that has relative net add or subtract refractive power(s) with respect to the central zone, although myopia progression can still likely be controllable even without the relative net add or subtract refractive power(s).

It should be noted that the present invention should be interpreted as comprising two refractive elements that are separated but close enough to enable a practical compact spectacle design, with the first element having a strong negative refractive power in its central zone and the second element having a less strong but positive refractive power in its central zone. The paracentral and peripheral zones can have different spatial refraction profiles or distribution as discussed above. Therefore, the function of the first element can also be realized with only one curved optical interface and the function of the second element can also be realized with only one curved optical interface. FIG. 21 shows one embodiment in which one relatively thick optical medium 2102 is shaped such that its central front surface 2154 is strongly concavely curved to function as a negative refracting element and its back surface 2156 is less strongly convexly curved to function as a positive refracting element. The thickness of the optical medium now functions to separate the negative refractive element from the positive refractive element. Such a design can also have a central zone, a paracentral zone and a peripheral zone with all the various properties discussed above included and the design should therefore also be considered as within the scope of the present invention. In one embodiment, the negative and positive refractive powers of the first and second refractive element can be achieved with nano-structured metamaterial so the surfaces are relatively flat. With such a design, the concept can be applied to contact lens designs as well.

In addition, the scope of the invention should also cover the case where there are more than two refracting elements as long as there is a strong negative refractive element in front of a less strong positive refractive element. For example, FIG. 22 shows an embodiment where three optical interfaces are employed and the intermediate optical interface 2257 serves the function to provide chromatic and spherical aberration corrections. In this case, the front curved surface 2254 and the back curved surface 2256 will likely have different curvatures as compared to those in FIG. 21.

Although various embodiments that incorporate the teachings of the present invention have been shown and described in detail herein, those skilled in the art can readily devise many other varied embodiments that still incorporate these teachings.

What is claimed is:

1. A wearable optical device configured to increase a Resolvable Object Distance Range (RODR) for a plurality of objects located along a visual angle distance by optically pushing a nearby object further away along the visual angle distance thereby reducing focusing demands when a user is visually fixating on a nearby one of the plurality of objects, and wherein the optical device includes:
a negative refractive element having an optical axis; and
a positive refractive element configured to be aligned with the negative refractive element along the optical axis;
wherein the negative refractive element and the positive refractive element are separated from each other along the optical axis by a separation space and at a separation distance suitable for mounting on a spectacle; and
wherein a surface of a non-central zone of at least one of the negative refractive element and the positive refractive element is a Fresnel surface, and wherein the separation space is substantially filled by a non-air intermediate media with a refractive index lower than that of the at least one of the negative refractive element and the positive refractive element.

2. The optical device of claim 1 wherein step angles of the Fresnel surface converge at a step convergence point.

3. The optical device of claim 2 herein the step convergence point is substantially centered within the user's eye globe.

4. The optical device of claim 1 wherein the reduction of focusing demands includes increasing a wider in-focus range of the plurality of objects located along the visual angle distance for the user with presbyopia, thereby increasing clarity of a larger subset of the plurality of objects.

5. The optical device of claim 1 wherein the intermediate media includes an optical grade resin or polymer.

6. The optical device of claim 1 further comprising a spacing seal located around a periphery of the separation space, and wherein the intermediate media is a low-humidity gas thereby substantially reducing condensation within the separation space during an ambient temperature change.

7. The optical devise of claim 6 wherein the low-humidity gas includes nitrogen, argon or helium.

8. The optical device of claim 6 wherein the spacing seal is formed by thickening an edge of the at least one of the negative refractive element and the positive refractive element.

9. The wearable optical device of claim 1 wherein the reduction of focus accommodating demands also reduces eyeball-elongation signal generation of the user to control myopia progression of the user.

10. The wearable optical device of claim 1 further comprising bringing a distant object closer along the visual angle distance.

11. The wearable optical device of claim 1 comprising:
a central zone; and
a non-central zone wherein at least one portion of the non-central zone has a net refractive power that is different from a net refractive power of the central zone.

12. The wearable optical device of claim 11 wherein a non-central one of the plurality of nearby objects is optically pushed to land forward or anterior with respect to a non-central region of a retina of the user when the user is visually fixating on a central nearby object.

13. The wearable optical device of claim 11 wherein the net refractive power of the non-central zone is higher than the net refractive power of the central zone for a myopic or emerging myopic user.

14. The wearable optical device of claim 11 wherein the net refractive power of the non-central zone is lower than the net refractive power of the central zone for a hyperopic user.

15. The wearable optical device of claim 11 wherein the non-central zone of the optical device includes a paracentral zone and a peripheral zone, and wherein the paracentral zone corresponds to a paracentral region of the retina coupled to a higher density of ganglion cells than a peripheral region of the retina.

16. The wearable optical device of claim 1 further comprising a spectacle frame.

17. The wearable optical device of claim 15 wherein the net refractive power changes continuously from the central zone to the paracentral zone.

18. The wearable optical device of claim 15 wherein the net refractive power changes continuously from the paracentral zone to the peripheral zone.

19. The wearable optical device of claim 15 wherein at least one of the paracentral and peripheral zone is formed with at least one of apodization, gradual transparent-to-opaque-transition, and gradual transparent-to-opaque-to-transparent transition.

20. The wearable optical device of claim 11 wherein the central zone includes at least one aspherical refractive surface configured to correct at least one of astigmatism and any other higher order aberrations.

21. The wearable optical device of claim 1 wherein the separation distance between the negative refractive element and the positive refractive element is adjustable to enable fine tuning and control of a net spherical refractive power.

22. The wearable optical device of claim 1 further comprising:
   an optical sensor configured to detect a light intensity; and
   an actuation mechanism configured to adjust a separation between the negative refractive element and the positive refractive element.

23. The wearable optical device of claim 1 wherein a focal point ($F_A$) of the negative refractive element and a focal point ($F_B$) of the positive refractive element are offset with respect to each other along the optical axis.

* * * * *